(12) United States Patent
Kimura et al.

(10) Patent No.: US 11,537,812 B2
(45) Date of Patent: *Dec. 27, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Shunichi Kimura, Kanagawa (JP); Yutaka Koshi, Kanagawa (JP); Masanori Sekino, Kanagawa (JP); Satoshi Kubota, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 365 days.

This patent is subject to a terminal disclaimer.

(21) Appl. No.: 16/847,627

(22) Filed: Apr. 13, 2020

(65) Prior Publication Data

US 2021/0124991 A1 Apr. 29, 2021

(30) Foreign Application Priority Data

Oct. 24, 2019 (JP) .............................. JP2019-193249

(51) Int. Cl.
*G06K 9/62* (2022.01)
*G06V 30/10* (2022.01)

(52) U.S. Cl.
CPC ......... *G06K 9/6254* (2013.01); *G06K 9/6201* (2013.01); *G06V 30/10* (2022.01); *G06V 2201/07* (2022.01)

(58) Field of Classification Search
None
See application file for complete search history.

(56) References Cited

U.S. PATENT DOCUMENTS

| 7,133,556 | B1 | 11/2006 | Matsushita et al. | |
|---|---|---|---|---|
| 9,053,350 | B1 * | 6/2015 | Abdulkader | G06V 10/987 |
| 2017/0083785 | A1 * | 3/2017 | Warsawski | G06K 9/6292 |
| 2018/0107892 | A1 * | 4/2018 | Istenes | G06K 9/6292 |

FOREIGN PATENT DOCUMENTS

| JP | 2000259847 | 9/2000 |
|---|---|---|
| JP | 2001084336 | 3/2001 |
| JP | 2003346080 | 12/2003 |
| JP | 2010073201 | 4/2010 |
| JP | 2016212812 | 12/2016 |

* cited by examiner

*Primary Examiner* — David Perlman
(74) *Attorney, Agent, or Firm* — JCIPRNET

(57) ABSTRACT

An information processing apparatus includes a processor configured to acquire a first recognition result and a first recognition probability on target data from a first recognizer, acquire a second recognition result and a second recognition probability on the target data from a second recognizer, execute checking of the first recognition result and the second recognition result, and execute first control in a case where the first recognition result and the second recognition result match each other as a result of the checking. The first control is control for executing either of first processing or second processing on the matched recognition result and outputting a processing result based on at least one of the first recognition probability or the second recognition probability. A human workload for the first processing is smaller than a human workload for the second processing.

12 Claims, 18 Drawing Sheets

GRAPH

GRAPH

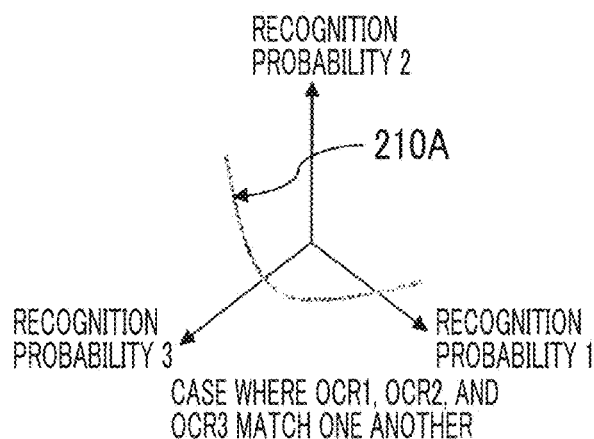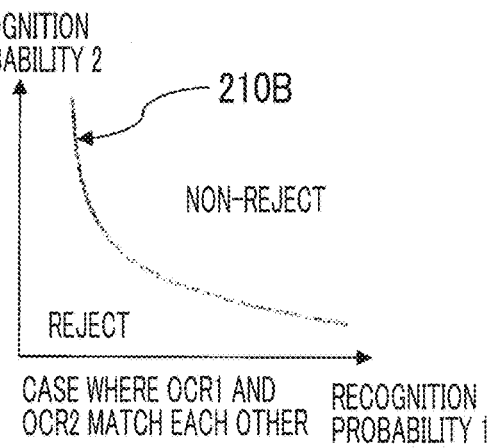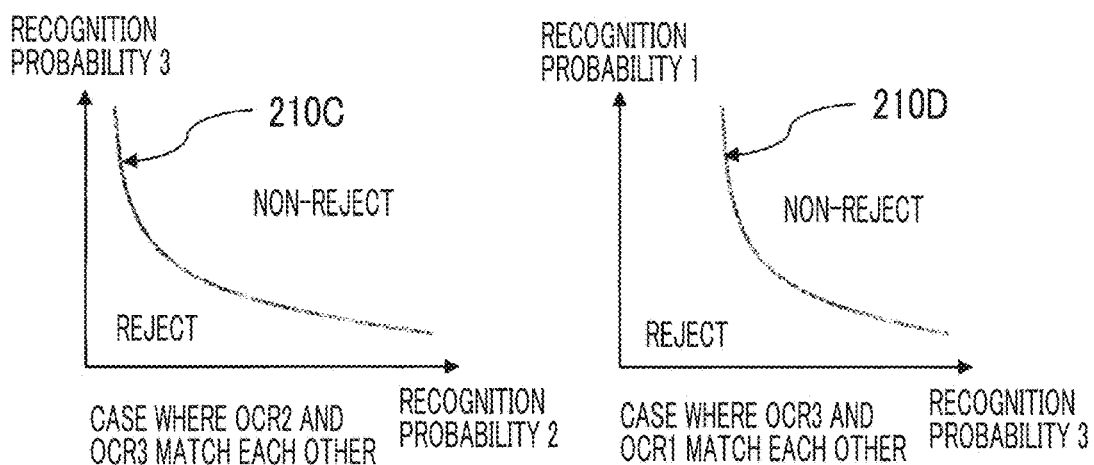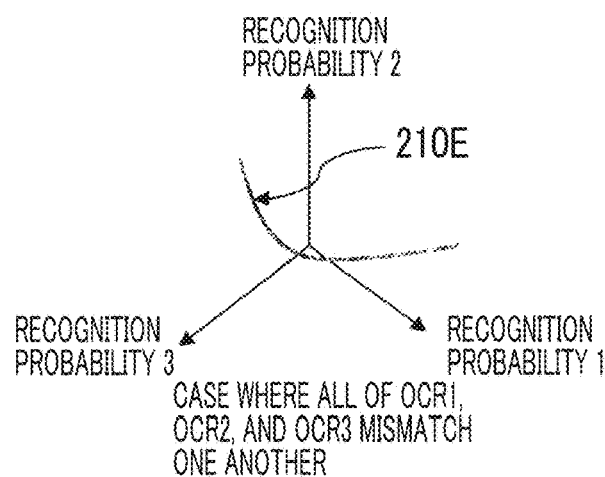

FIG. 16

| OCR NUMBER | ADOPTED (1) / NON-ADOPTED (0) |
|---|---|
| 1 | 1 |
| 2 | 0 |
| 3 | 1 |
| ... | |
| N | 1 |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-193249 filed Oct. 24, 2019.

BACKGROUND

(i) Technical Field

The present invention relates to an information processing apparatus and a non-transitory computer readable medium storing a program.

(ii) Related Art

An apparatus is known that makes a first recognizer and a second recognizer recognize target data, checks recognition results of the two recognizers, in a case where both recognition results match each other, outputs the matched recognition result as a final result, and in a case where both recognition results do not match each other, outputs a final recognition result through a verification operation or a correction operation by human intervention.

An apparatus described in JP2010-073201A includes an image reading unit that reads a data-written form (document) as an electronic image form, an OCR recognition unit that performs OCR recognition on the read electronic image form with at least two kinds (or more) OCR engines having have different properties, that is, in which incorrect recognition is not commonized or hardly commonized, and a database saving unit that automatically saves a text, of which recognition results coincide with each other, in a database and saves a text, of which recognition results do not coincide with each other, and a text with low reliability in recognition of either OCR engine in the database after verification and correction.

Furthermore, a data input system that converts a text string handwritten or printed on a paper document into digital data is known. The data input system digitizes a text string on a document using a system in which a person reads the document and inputs the text string through key input, a system in which a text recognizer using an optical text recognition (optical character recognition (OCR)) technique executes text recognition processing on an image on the document, or a combination of the systems.

Many text recognizers have a function of outputting a degree indicating how reliable a processing result of executed recognition processing is. The degree is referred to as a probability or certainty (hereinafter, referred to as a recognition probability or simply referred to as a probability).

In addition to the text recognizer, there are units that perform some automatic determination on an input image. Among the automatic determination units, some units output a probability of performed determination.

A method disclosed in JP2016-212812A performs text recognition on an image on an input document, obtains a similarity as a text recognition result, compares the obtained similarity with certainty requested to text recognition registered in advance, and performs, based on a result of the comparison, an output without needing manual verification processing on the text recognition result, performs an output to present an option of a text recognition candidate on the text recognition result based on the result of the comparison to prompt manual verification processing, or performs an output to present a manual new input and confirmation on the text recognition result based on the result of the comparison to prompt manual input processing.

As the related art in which a probability of a recognizer is used, there are also JP2000-259847A and JP2003-346080A.

As the related art in which recognition is controlled using checking of a plurality of recognizers, there is also JP2001-084336A.

SUMMARY

Even though recognition results of one target image with two recognizers match each other, in a case where the recognition probability of the recognition result is low, an output result of outputting the matched recognition result may be different from a correct answer in a case where a person verifies, and it is not clear whether to acknowledge the recognition result of the recognizer as a correct answer. In this case, the person should verify all output results; however, a human workload increases.

Aspects of non-limiting exemplary embodiments of the present disclosure relate to an information processing apparatus and a non-transitory computer readable medium storing a program that can increase a correct answer of an output result output from an information processing apparatus while suppressing a human workload.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire a first recognition result and a first recognition probability on target data from a first recognizer, acquire a second recognition result and a second recognition probability on the target data from a second recognizer, execute checking of the first recognition result and the second recognition result, and execute first control in a case where the first recognition result and the second recognition result match each other as a result of the checking, in which first control is control for executing either of first processing or second processing on the matched recognition result and outputting a processing result based on at least one of the first recognition probability or the second recognition probability and a human workload for the first processing is smaller than a human workload for the second processing.

BRIEF DESCRIPTION OF THE DRAWINGS

Exemplary embodiment(s) of the present invention will be described in detail based on the following figures, wherein:

FIGS. 12A to 12E are diagrams illustrating a threshold value curved surface that is prepared for each checking result of OCR results of three OCRs;

FIG. 16 is a diagram illustrating a system in which a group including one or more OCRs is represented by a binary identification code in the system using the N OCRs;

DETAILED DESCRIPTION

Exemplary Embodiment Using Two OCRs

Figure 1:
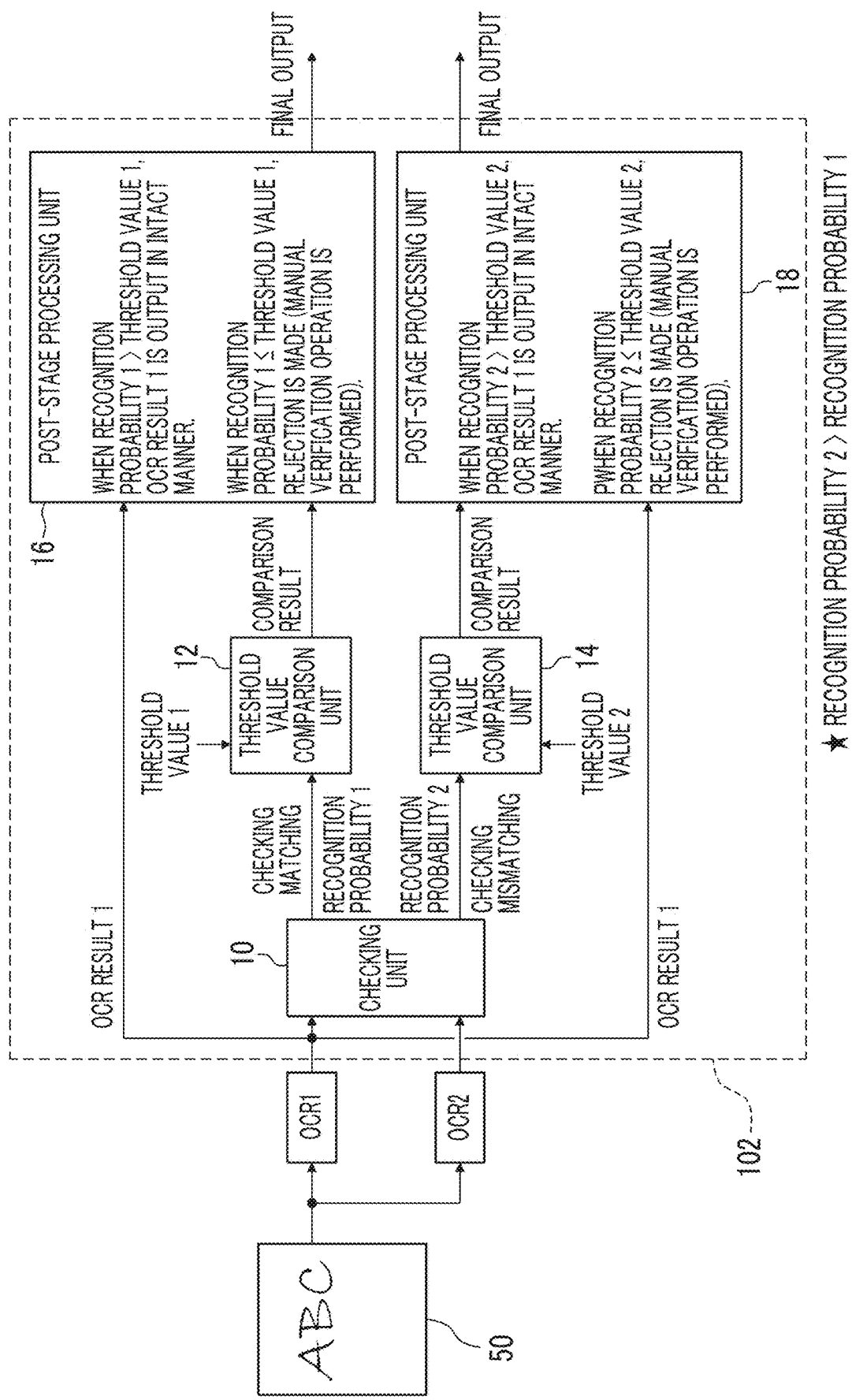
FIG. 1 is a diagram illustrating a system configuration of an exemplary embodiment.

Referring to FIG. 1, an exemplary embodiment of a data input system will be described.

In the system, even though recognition results of two text recognizers on one target image match each other, the recognition result is not immediately adopted as a final output of the system. Verification is performed whether or not a recognition probability of at least one of the two recognition results satisfies a condition, and only in a case where the recognition probability satisfies the condition, the matched recognition result is adopted as the final output of the system.

In the system, input image data 50 that is a target of text recognition is input to two text recognizers, that is, OCR1 and OCR2. The OCR1 and the OCR2 execute text recognition processing with characteristics different from each other. That is, the OCR1 and the OCR2 use, for example, different text recognition programs from each other or different sets of learning data for learning of text recognition from each other. In a case where a group of a sufficiently large number of sample images is processed by the OCR1 and the OCR2, a distribution of a correct answer (that is, correct recognition) and an incorrect answer (that is, incorrect recognition) of OCR results on the sample image group is different between the OCR1 and the OCR2.

The OCR1 performs text recognition processing on the input image data 50, and outputs an OCR result 1 as a result of the text recognition processing and a recognition probability 1 (hereinafter, also referred to as "probability 1") as a probability of recognition for the OCR result 1. The OCR result 1 is typically text data indicating a text string recognized from the input image data 50. The OCR2 performs text recognition processing on the same input image data 50, and outputs an OCR result 2 and a recognition probability 2 for the OCR result 2.

In the system of FIG. 1, it is assumed that, out of the OCR1 and the OCR2, the former is selected as a reference OCR as an example. The reference OCR is one of the OCR1 and the OCR2 that is assumed to be appropriate for text recognition on the input image data 50. The reference OCR may be determined fixedly, for example. For example, the OCR1 is an OCR that is known to have a sufficient record of use and a generally high recognition accuracy rate and is mostly used, and the OCR2 is an OCR for assistance that has a little record of use. For this reason, a case where the former is defined fixedly as a reference is an example of the above-described case. A case where the reference OCR is selected according to a known attribute for the input image data 50 is also considered. For example, in a case where the OCR1 is optimized for name recognition, and the OCR2 is optimized for address recognition, the OCR1 is selected as the reference OCR in a case where it is understood that the input image data 50 shows a name. There is a case where the attribute of the input image data 50 can be discriminated from a position or the like of the input image data 50 in an image of one page. For example, in a case where an image obtained by cutting a range known as a name field in an image of a certain document is the input image data 50, it is understood that the attribute of the input image data 50 is a name. The "accuracy rate" used herein is a ratio of a sum of really correct output information to the total number of pieces of information output as a final recognition result from the system.

A checking unit 10 performs checking processing of the OCR result 1 and the OCR result 2. In the checking processing, a text string of the OCR result 1 and a text string of the OCR result 2 are compared (that is, checked), and determination is made whether both OCR results match each other (that is, the text strings coincide with each other) or not (that is, mismatch each other). In a case where both OCR results match each other, the checking unit 10 outputs the probability 1 to a threshold value comparison unit 12. In a case where both OCR results mismatch each other, the checking unit 10 outputs the probability 1 to a threshold value comparison unit 14 different from the threshold value comparison unit 12.

The threshold value comparison unit 12 compares the probability 1 with a predetermined threshold value 1 and outputs a comparison result indicating whether or not the probability 1 is greater than the threshold value 1.

The threshold value comparison unit 14 compares the probability 1 with a threshold value 2 and outputs a comparison result indicating whether or not the probability 1 is greater than the threshold value 2. Here, the threshold value 2 is a predetermined threshold value that is greater than the threshold value 1.

A post-stage processing unit 16 receives the OCR result 1 as a processing result of the reference OCR and the comparison result of the threshold value comparison unit 12. Then, in a case where the received comparison result indicates that the probability 1 is greater than the threshold value 1, the post-stage processing unit 16 outputs the OCR result 1 as the final recognition result of the system. In contrast, in a case where the received comparison result indicates that the probability 1 is equal to or lower than the threshold value 1, the post-stage processing unit 16 rejects the OCR result 1.

The term "reject" refers to processing for not adopting a target OCR result (in this case, the OCR result 1). In a case where the OCR result 1 is rejected, the system requests an operator for intervention in order to obtain a recognition result on the input image data 50 as the system. A system in which the final recognition result of the system is obtained by operator intervention is not particularly limited. One of the operator intervention systems is "verification and correction" processing for verifying or correcting the recognition result. In the "verification and correction" processing, the input image data 50 and the OCR result 1 are displayed on a screen of a terminal of the operator, and the operator compares both of the input image data 50 and the OCR result 1 to verify whether or not the OCR result 1 is correct and inputs information indicating that the OCR result 1 is verified to be correct in a case where the OCR result 1 is correct. In a case where the OCR result 1 is not correct, the operator performs an input for correcting a wrong portion of the OCR result 1. The processing result verified or corrected through such a "verification and correction" operation is output as the final recognition result of the system.

The post-stage processing unit 18 receives the OCR result 1 as the processing result of the reference OCR and the comparison result of the threshold value comparison unit 14. Then, in a case where the received comparison result indicates that the probability 1 is greater than the threshold value 2, the post-stage processing unit 18 outputs the OCR result 1 as the final recognition result of the system. In contrast, in a case where the received comparison result indicates that the probability 1 is equal to or lower than the threshold value 2, the post-stage processing unit 18 rejects the OCR result 1, executes the "verification and correction" processing, and outputs a processing result as the final recognition result.

In the post-stage processing unit 16 or 18, information indicating that "recognition is impossible" may be output instead of executing the "verification and correction" processing in a case where the OCR result is rejected.

A major part of the system shown in FIG. 1 is implemented using a computer in an example.

Figure 2:
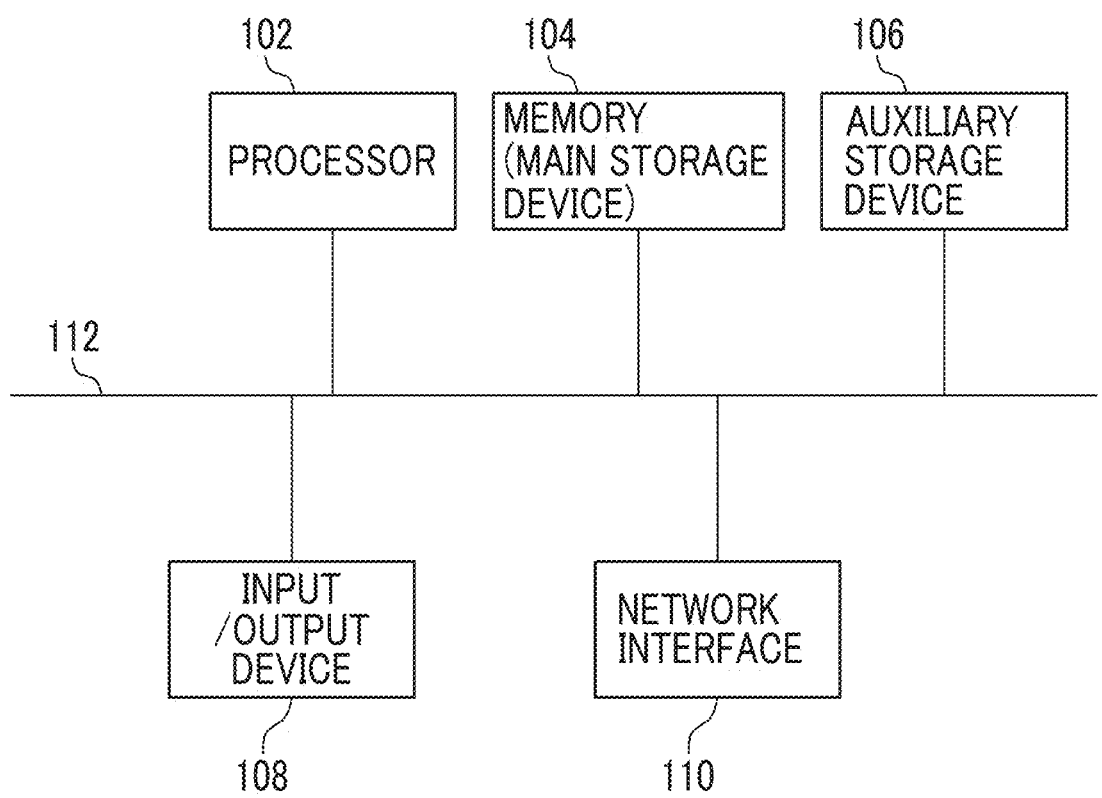
FIG. 2 is a diagram illustrating a hardware configuration of a computer that executes major information processing of the system.

The computer has, for example, a circuit configuration in which, as shown in FIG. 2, a processor 102, a memory (main storage device) 104, such as a random access memory (RAM), a controller, which controls an auxiliary storage device 106, such as a flash memory, a solid state drive (SSD), or a hard disk drive (HDD), an interface for connection to various input/output devices 108, a network interface 110, which performs control for connection to a network, such as a local area network, and the like as hardware, are connected through a data transmission path, such as a bus 112. A program group that defines the functions of the checking unit 10, the threshold value comparison units 12 and 14, and the post-stage processing units 16 and 18 is installed on the computer by way of the network or the like and is saved in the auxiliary storage device 106. The program group saved in the auxiliary storage device 106 is executed by the processor 102 using the memory 104, whereby the functions of the units are implemented.

In the embodiments above, the term "processor 102" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor 102" is broad enough to encompass one processor 102 or plural processors 102 in collaboration which are located physically apart from each other but may work cooperatively. The order of operations of the processor 102 is not limited to one described in the embodiments above, and may be changed.

In the system configuration of FIG. 1, the checking unit 10, the threshold value comparison units 12 and 14, and the post-stage processing units 16 and 18 are implemented by the processor 102 executing the programs representing the functions of the units. The OCR1 and the OCR2 may be implemented by the processor 102 executing programs representing the text recognition processing or may be as an OCR system external to the processor 102.

Figure 3:
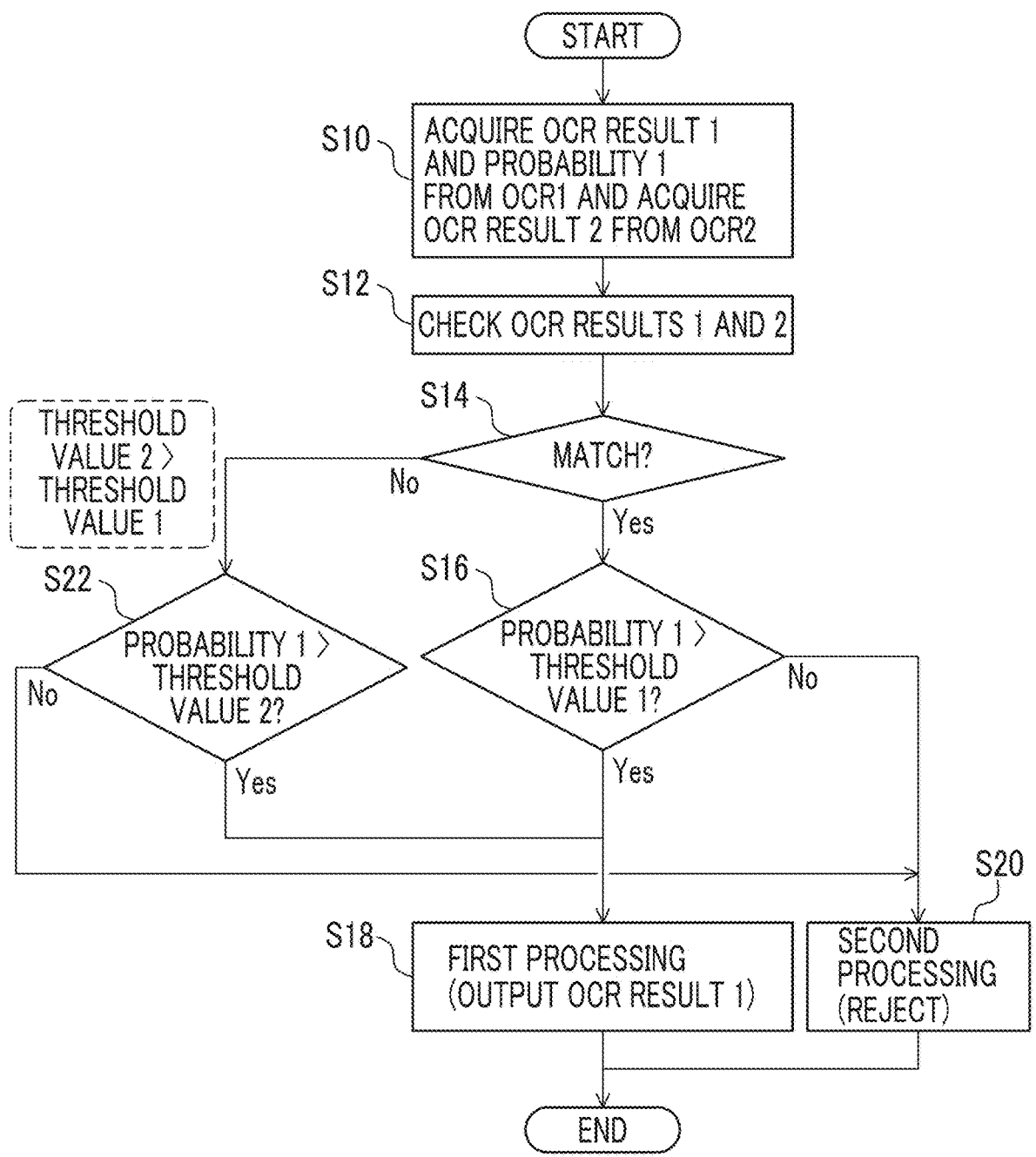
FIG. 3 is a diagram illustrating a processing procedure of the system.

FIG. 3 illustrates a processing procedure of the processor 102 that executes processing of the system of FIG. 1. In the procedure, the processor 102 first acquires the OCR results 1 and 2 on the input image data 50 from the OCR1 and the OCR2, and acquires the probability 1 from the OCR1 (S10). Next, the processor 102 checks the OCR results 1 and 2 (S12), and determines whether a result of the checking is matching or mismatching (S14). In a case where the checking result is matching, the processor 102 compares the probability 1 with the threshold value 1 (S16). Then, in a case where the probability 1 is higher than the threshold value 1 as a result of the comparison, the processor 102 executes first processing (S18), and otherwise, the processor 102 executes second processing (S20). In S14, in a case the checking result is mismatching, the processor 102 compares the probability 1 with the threshold value 2 higher than the threshold value 1 (S22), in a case where the probability 1 is higher than the threshold value 2, executes the first processing (S18), and otherwise, executes the second processing (S20).

The first processing is processing with a workload of the operator relatively smaller than the second processing. For example, as illustrated in FIG. 1, processing in which the OCR result 1 is adopted as a final processing result in an intact manner without operator intervention is an example of the first processing, and processing in which the OCR result is rejected and subjected to "verification and correction" by the operator is an example of the second processing.

As another example of the first processing, there is processing in which only the verification of the OCR result is requested to the operator. In the processing, the processor 102 displays the input image data 50 and the OCR result 1 on the screen of the terminal of the operator and requests the operator for an input of a verification result regarding whether or not the OCR result 1 is correct. As another example of the second processing in lieu of the "verification and correction" of the operator, there is processing in which the input image data 50 is presented to the operator to make the operator input text data of the text string included in the input image data 50.

The first processing requires the same human workload as the second processing or a human workload smaller than the second processing. For this reason, the first processing is selected in a case where the OCR results 1 and 2 match each other or a specific condition that the probability 1 is higher than the threshold value is satisfied, whereby the human workload is suppressed while the accuracy rate of the recognition result is secured.

Figure 4:
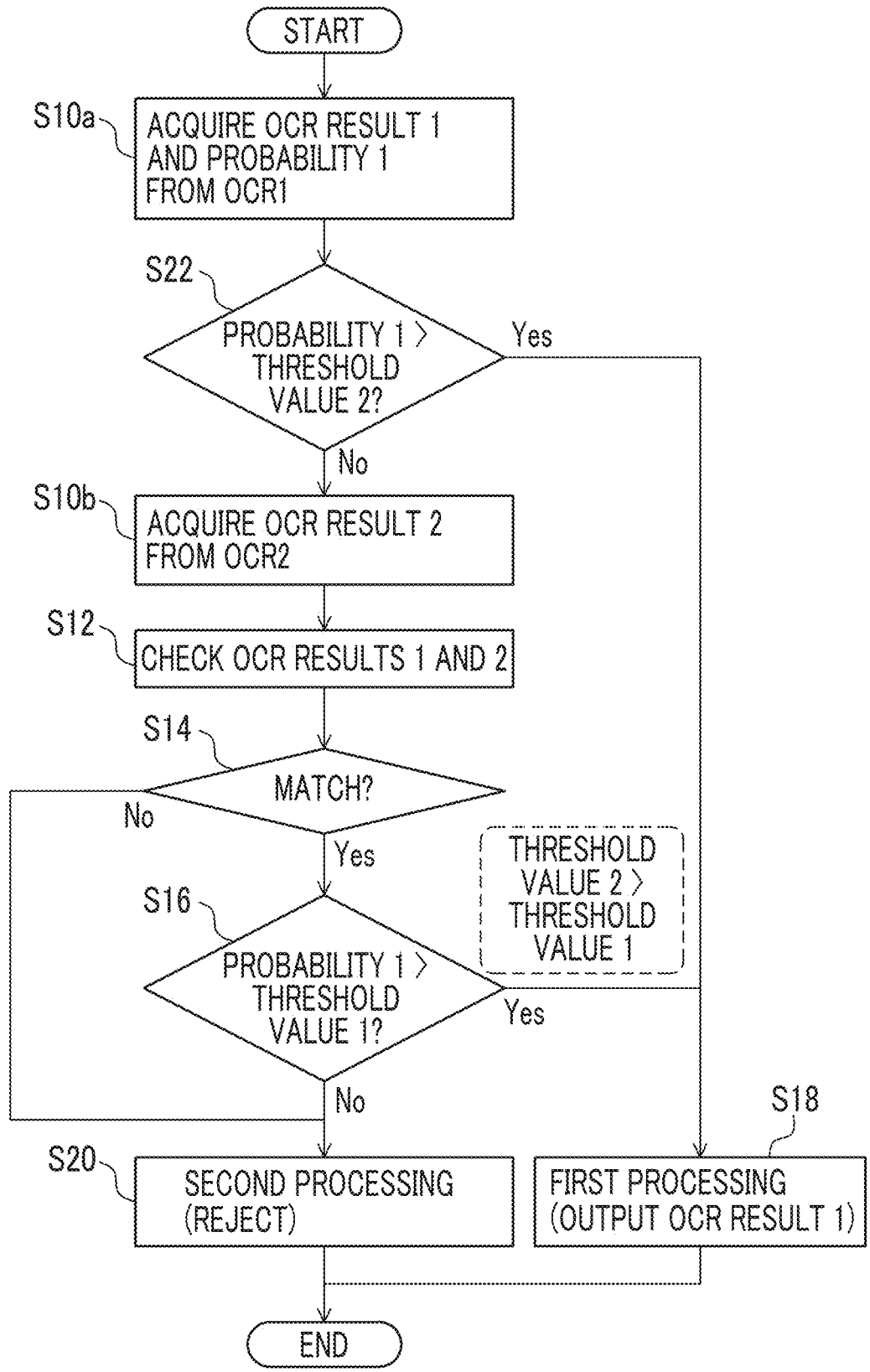
FIG. 4 is a diagram showing another example of a processing procedure of the system.

Another procedure in which the same effects as the procedure illustrated in FIG. 3 is illustrated in FIG. 4. The procedure of FIG. 4 devises a case where the recognition processing of the OCR2 can be omitted by performing the comparison (S22) of the probability 1 and the threshold value 2 before the checking processing (S12).

In the procedure, the processor 102 first acquires the OCR result 1 and the probability 1 on the input image data 50 from the OCR1 (S10a). At this point of time, the OCR2 may not execute text recognition on the input image data 50. Next, the processor 102 determines whether or not the probability 1 is higher than the threshold value 2 (S22). In a case where a determination result of S22 is Yes, the processor 102 executes the first processing (S18).

In a case where the determination result of S22 is No, the processor 102 makes the OCR2 execute text recognition on the input image data 50 to acquire the OCR result 2 (S10b). Next, the processor 102 checks the OCR results 1 and 2 (S12), and determines whether a result of the checking is matching or mismatching (S14). In a case where the checking result is matching, the processor 102 compares the probability 1 with the threshold value 1 (S16). Then, in a case where the probability 1 is higher than the threshold value 1 as a result of the comparison, the processor 102 executes first processing (S18), and otherwise, the processor 102 executes second processing (S20). On the other hand, in a case where determination is made S14 that the checking result is mismatching, the processor 102 executes the second processing (S20).

In the procedure of FIG. 4, in a case where the determination result of S22 is Yes, since the OCR result 2 is unnecessary, the OCR2 may remain the text recognition unexecuted. Accordingly, in a case where the OCR2 is implemented by the processing of the processor 102, a load of the processor 102 is reduced as much as the OCR2 does not execute the text recognition. Furthermore, in a case where an external OCR service is used as the OCR2, a processing amount of the whole system or human or physical cost required for the processing is reduced as much as the external service is not used.

In the system or the processing procedure described above referring to FIGS. 1 to 4, even though the checking result of the OCR results 1 and 2 is matching, only after a condition that the probability 1 is higher than the threshold value 1 is satisfied, and the matched OCR result is adopted as the final recognition result of the system. Accordingly, a situation in which OCR results with low reliability (that is, low probability) match each other unexpectedly and are adopted as a final recognition result is prevented.

In the system of FIG. 1, even though the checking result of the OCR results 1 and 2 is mismatching, the OCR results are not immediately rejected. In this case, the system checks whether or not a condition stricter than in a case where the checking result is matching that the probability 1 is higher than the threshold value 2 higher than the threshold value 1 is satisfied, and in a case where the condition is satisfied, adopts the OCR result 1 as a final processing result. In this way, even though the checking result is mismatching, in a case where the probability 1 of the OCR result 1 is very high, the OCR result 1 is adopted. With this, the number of operation steps due to human intervention is reduced compared to a system of the related art in which the OCR results are rejected immediately in a case where the OCR results do not match each other.

There is heretofore a system in which a single OCR is used, and in a case where a probability for an OCR result obtained by the OCR is higher than a threshold value, the OCR result is adopted. However, the system of the related art is applied to an OCR result obtained using a single OCR. The threshold value that is used in this case is a considerably high value. In contrast, the threshold value 1 that is used by the threshold value comparison unit 14 of the system of FIG. 1 is applied in a case where the OCR results 1 and 2 match each other, and may be set to a value lower than the threshold value in the system of the related art. As two OCR results obtained by different recognition systems coincide with each other, it is considered that a possibility that the OCR result 1 is a correct answer is high to a certain level. For this reason, even though the threshold value 1 for determining final adoption or rejection is low to a certain level, the same accuracy rate as the system of the related art is achieved.

On the other hand, in a case where the same value as the threshold value used in the system of the related art is used as the threshold value 2, the same accuracy rate as in the related art is implemented.

Figure 5A:
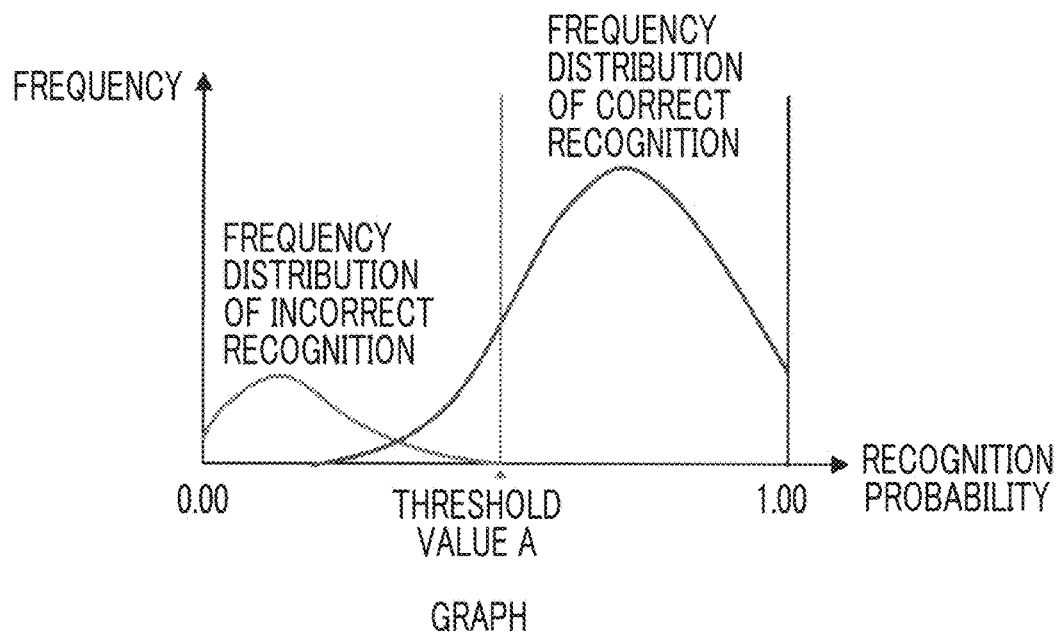
FIGS. 5A and 5B are diagrams illustrating effects that are obtained by the system.

This will be described referring to FIGS. 5A and 5B. A graph shown in FIG. 5A shows a frequency distribution of correct recognition and a frequency distribution of incorrect recognition among OCR results for a large number of input images in the system of the related art using a single OCR. The horizontal axis is a probability. As can be seen from the graph (a), although incorrect recognition is almost eliminated in a case where the probability is high to a certain level, there is a section where correct recognition and incorrect recognition are mixed in a range where the probability is low to a certain level. In such distributions, it is necessary to adopt a threshold value A shown in the drawing in order to make the accuracy rate (the rate of correct recognition to the whole) of the OCR be equal to or greater than in the related art.

Figure 5B:
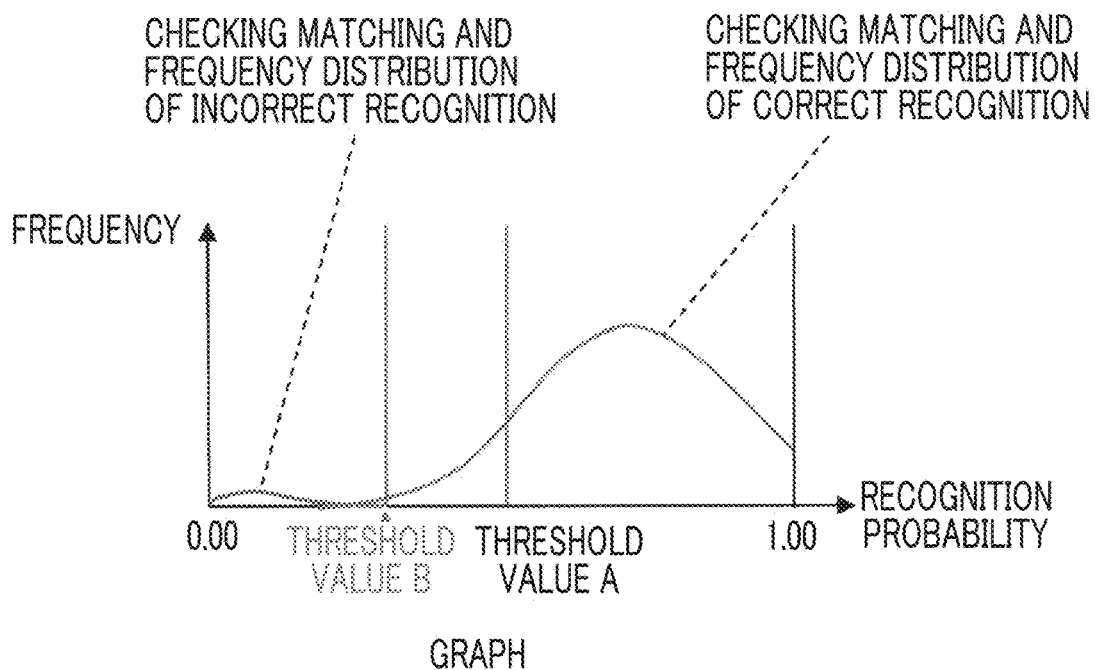

In contrast, a graph shown in FIG. 5B shows a frequency distribution of correct recognition and incorrect recognition obtained for a large number of input images in the system described referring to FIGS. 1 to 4. The frequency distribution is a frequency distribution of correct recognition and incorrect recognition with the probability on the horizontal axis in a case where the result of the checking of the OCR results 1 and 2 is matching. The graph (b) is for a case where the checking result is matching, and a ratio of correct recognition is higher than in a general case where both of matching and mismatching are included. As a result, a threshold value B lower than the threshold value A in the related art is sufficient to obtain the same accuracy rate as in the related art. The number of non-rejected OCR results (that is, OCR results to which the first processing with a small human workload is applied) increases as much as the low threshold value is used, and a human workload is reduced. That is, in a case where the checking result is matching, a human workload is expected to be reduced.

On the other hand, in a case where the same value as the threshold value A in the related art is used as the threshold value 2 in a case where the checking result is mismatching, the same accuracy rate as in the related art is expected. A human workload required in a case of mismatching is expected to be the same as in the related art.

Accordingly, in a case where both of matching and mismatching are integrated, the system of the exemplary embodiment requires a human workload smaller than the system of the related art as much as a workload is reduced in a case of matching.

Example where Probabilities 1 and 2 are Considered in Case of Matching

A modification example of the processing procedure of FIG. 3 will be described referring to FIG. 6. In a processing procedure of FIG. 6, steps representing the same processing as the steps of the processing procedure of FIG. 3 are represented by the same reference numerals, and overlapping description will not be repeated.

Figure 6:
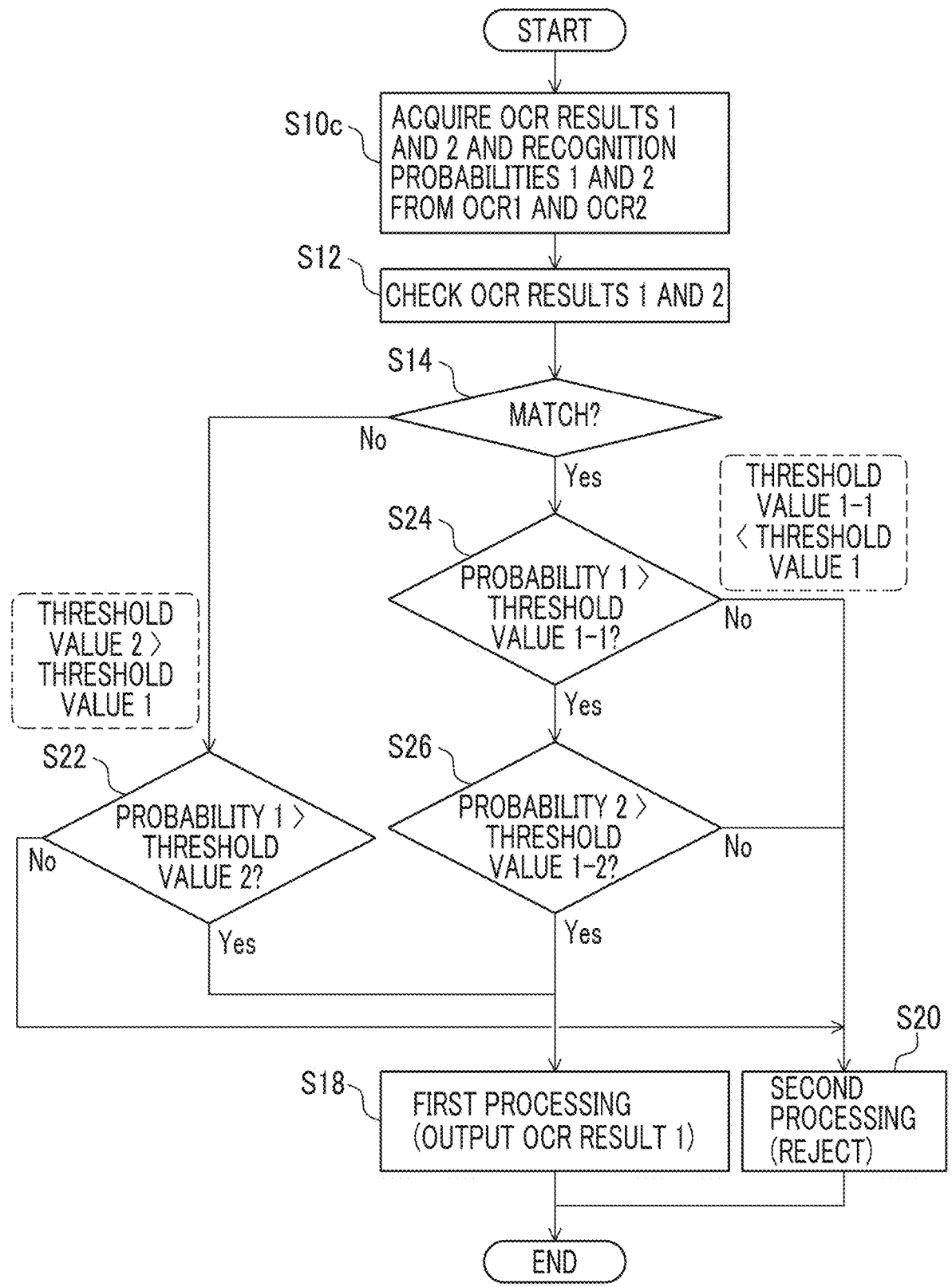
FIG. 6 is a diagram illustrating a processing procedure for performing threshold value comparison for both probabilities 1 and 2 in a case where a checking result is matching.

In the processing procedure of FIG. 6, in a case where determination is made in S14 that the OCR results 1 and 2 match each other, the processor 102 compares the probability 1 with a threshold value 1-1 (S24), and compares the probability 2 with a threshold value 1-2 (S26). Then, the processor 102 executes the first processing in a case where both of the determination results of S24 and S26 are Yes (S18), and executes second processing in a case where any one of the determination results of S24 and S26 is No (S20).

In the processing procedure of FIG. 3, only the probability 1 is checked in a case where the OCR results 1 and 2 match each other. In contrast, in the processing procedure of FIG. 6, both probabilities 1 and 2 are checked, and only in a case where both probabilities 1 and 2 are higher than the corresponding threshold values 1-1 and 1-2, the first processing (S18) is selected. For this reason, the threshold value 1-1 may be a value lower than the threshold value 1 compared with the probability 1 in the processing procedure of FIG. 3.

In the processing procedure of FIG. 6, as the threshold value 1-1 lower than the threshold value 1 in the processing procedure of FIG. 3 is used, the number of non-rejected OCR results increases, and consequently, a human workload is reduced. This will be described referring to FIG. 7.

Figure 7:
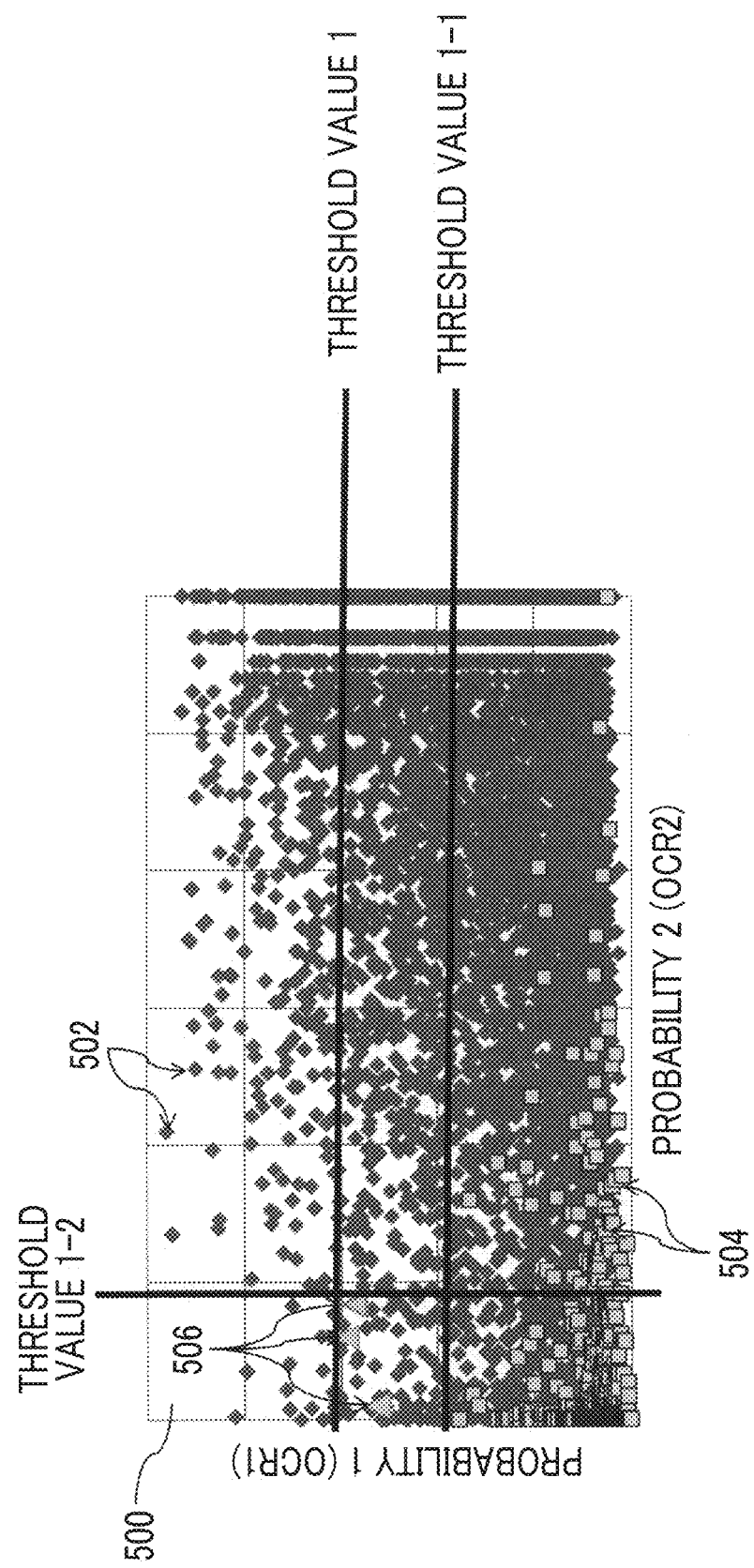
FIG. 7 is a diagram illustrating effects that are obtained by the processing procedure of FIG. 6.

FIG. 7 shows a scatter diagram 500 of the OCR results when the OCR1 and the OCR2 are made to recognize a large number of sample input images. In the scatter diagram 500, the vertical axis is the probability 1 and the horizontal axis is the probability 2. The probability 1 is higher toward an upper side, and the probability 2 is higher toward a left side. A dark rhombic plot 502 indicates a sample of correct recognition, and light square and triangular plots 504 and 506 indicate samples of incorrect recognition.

In a distribution shown in FIG. 7, the probability 1 has to be higher than the threshold value 1 shown in the drawing in order to make the accuracy rate be 100% only using the probability 1. In contrast, in a case where both probabilities 1 and 2 are used, the accuracy rate becomes 100% in a case where the probability 1 is higher than the threshold value 1-1 shown in the drawing and the probability 2 is higher than the threshold value 1-2. In comparison of a range where the probability 1 is higher than the threshold value 1 and a range where the probability 1 is higher than the threshold value 1-1 and the probability 2 is higher than the threshold value 1-2, the latter range includes a greater number of plots 502 of correct recognition. Accordingly, in the latter range, a human workload required as the whole system is reduced as much as the number of OCR results, to which the first processing with a relatively small human workload is applied, is large.

In the processing procedure of FIG. 6, as in the processing procedure of FIG. 3, the same modification example as the modification example (see FIG. 4) where S22 is executed before checking is considered.

Example where Both Probabilities 1 and 2 are Used

Next, an example of a processing procedure using both probabilities 1 and 2 in both of matching and mismatching will be described.

Figure 8A:
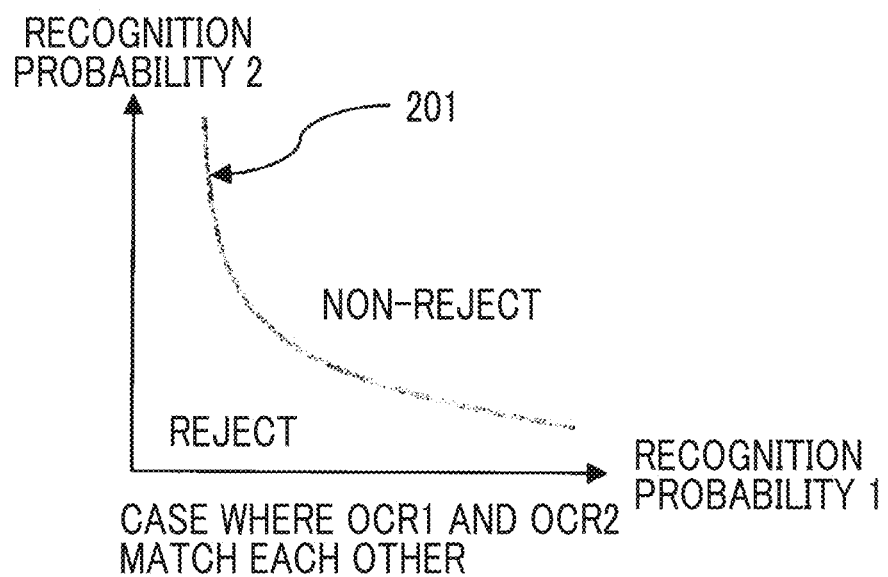
FIGS. 8A and 8B are diagrams illustrating a threshold value curve in an example where threshold value comparison is performed for both probabilities 1 and 2.
Figure 8B:
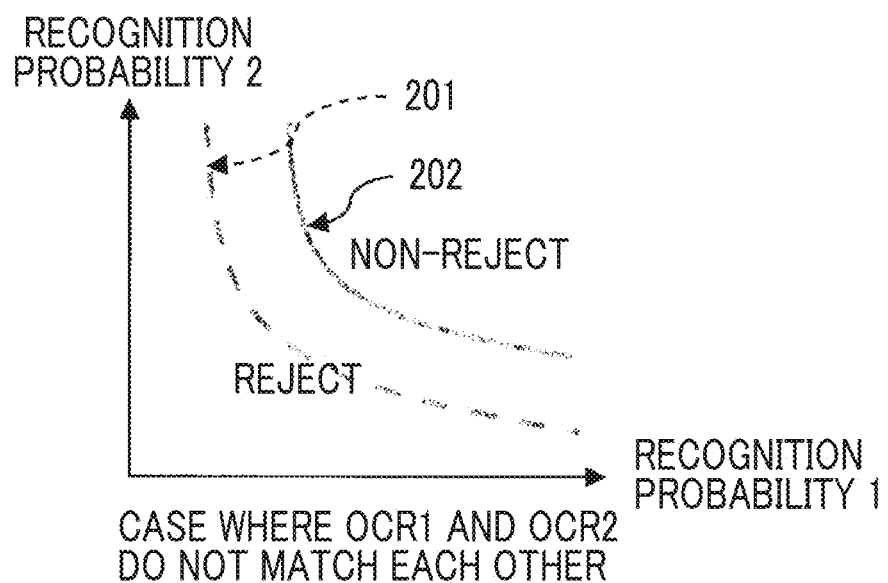

In the procedure, threshold value curves 201 and 202 illustrated in FIGS. 8A and 8B are used. FIGS. 8A and 8B show a two-dimensional coordinate space in which the horizontal axis is the probability 1 and the vertical axis is the probability 2. The threshold value curves 201 and 202 are curves showing threshold values in the two-dimensional space.

The threshold value curve 201 is a threshold value curve that is used in a case where the checking result of the OCR results 1 and 2 is matching. In a case where coordinates indicated by the set of the probabilities 1 and 2 on the OCR results are at a position below the threshold value curve 201, the OCR results are rejected (that is, the second processing is applied). Conversely, in a case where the coordinates are above the threshold value curve 201, the OCR results are non-rejected, that is, the first processing is applied to the OCR result.

The threshold value curve 202 is a threshold value curve that is used in a case where the checking result of the OCR results 1 and 2 is mismatching. An upper limit relationship between the coordinates including the probabilities 1 and 2 and the threshold value curve 202 and a relationship of reject and non-reject of the corresponding OCR results are the same as in the threshold value curve 201.

The threshold value curve 202 that is used in a case of mismatching is positioned above the threshold value curve 201 that is used in a case of matching. That is, in a case of mismatching, a probability required for applying the first processing to the OCR result is higher than in a case of matching.

Figure 9:
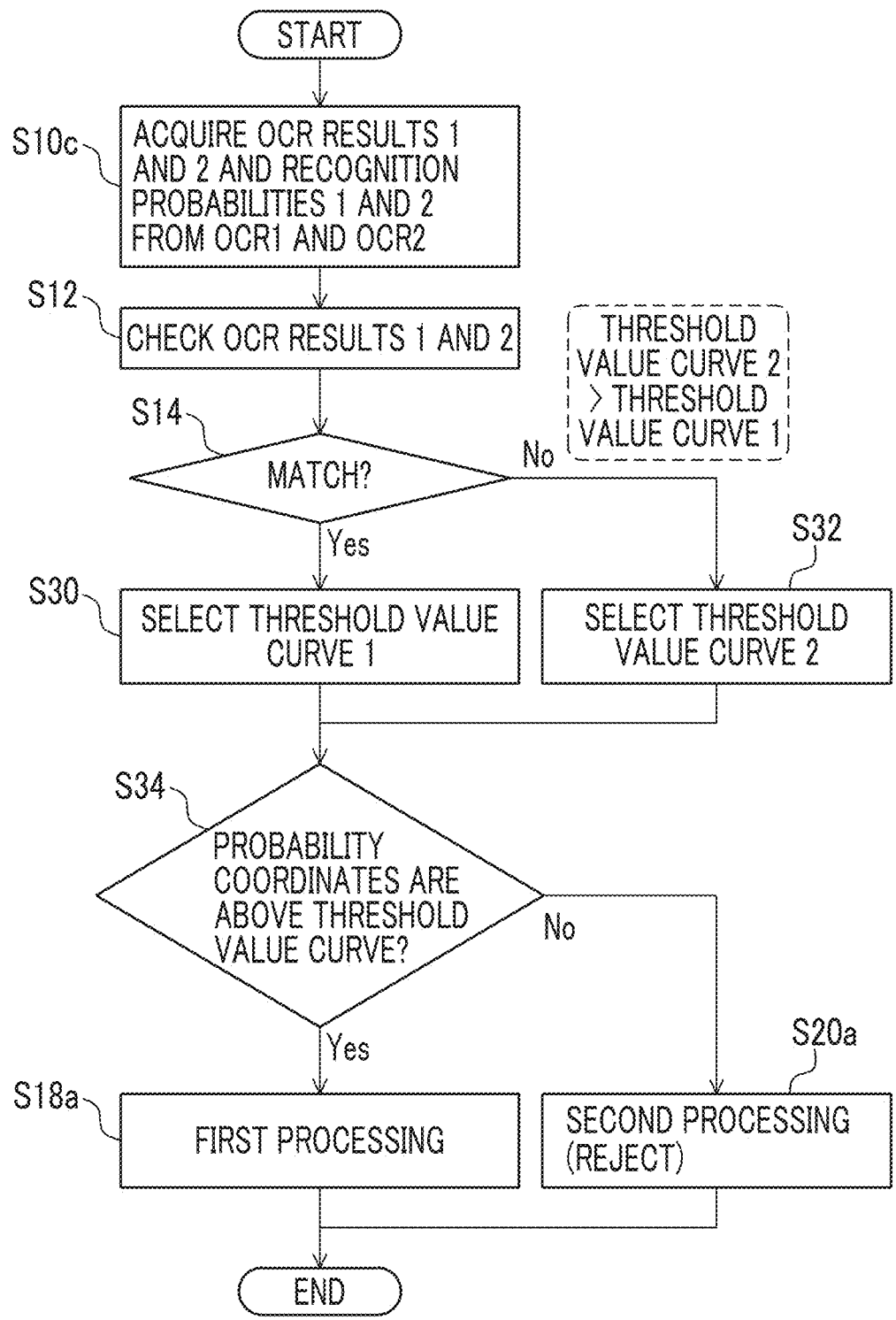
FIG. 9 is a diagram illustrating a processing procedure of an example where threshold value comparison is performed for both probabilities 1 and 2.

FIG. 9 illustrates a processing procedure of the processor in the example. In the procedure of FIG. 9, the processor 102 first acquires the OCR result 1 and the probability 1 from the OCR1, and acquires the OCR result 2 and the probability 2 from the OCR2 (S10c). Next, the processor 102 checks the OCR results 1 and 2 (S12), and determines whether or not both OCR results match each other (S14). In a case where a determination result of S14 is Yes, the processor 102 selects a threshold value curve 1 (that is, the threshold value curve 201 of FIG. 8A) stored in the auxiliary storage device 106 (S30). On the other hand, in a case where the determination result of S14 is No, the processor 102 selects a threshold value curve 2 (the threshold value curve 202 of FIG. 8B) stored in the auxiliary storage device 106 (S32). Next, the processor 102 determines whether or not the coordinates (probability 1, probability 2) indicated by the set of the probabilities 1 and 2 acquired in S10c are positioned above the previously selected threshold value curve (S34). In a case where a line segment connecting the coordinates and the coordinate origin (that is, a point of probability 1=0 and probability 2=0) intersects the threshold value curve, the coordinates are positioned above the threshold value curve, and otherwise, the coordinates are positioned below the threshold value curve.

In a case where a determination result of S34 is Yes, the processor 102 applies the first processing to the OCR results (S18a), and otherwise, the processor 102 applies the second processing to the OCR results (S20a). Here, in a case where one of the OCR1 and OCR2 is selected as the reference OCR, in S18a and S20a, the OCR result of the reference OCR should be a target of the first processing and the second processing. In a case where the reference OCR is not determined, and in a case where the OCR results 1 and 2 mismatch each other, in S18a and S20a, out of the OCR results 1 and 2, the OCR result corresponding to a relatively higher probability out of the probabilities 1 and 2 may be a processing target.

By comparison of the coordinates indicated by the set of the probabilities 1 and 2 and the threshold value curve, non-reject determination is made and the first processing is applied or reject determination is made and the second processing is applied, whereby the number of cases where OCR result is non-rejected increases compared to the example of FIGS. 1 and 3. This leads to reduction in human workload.

Figure 10:
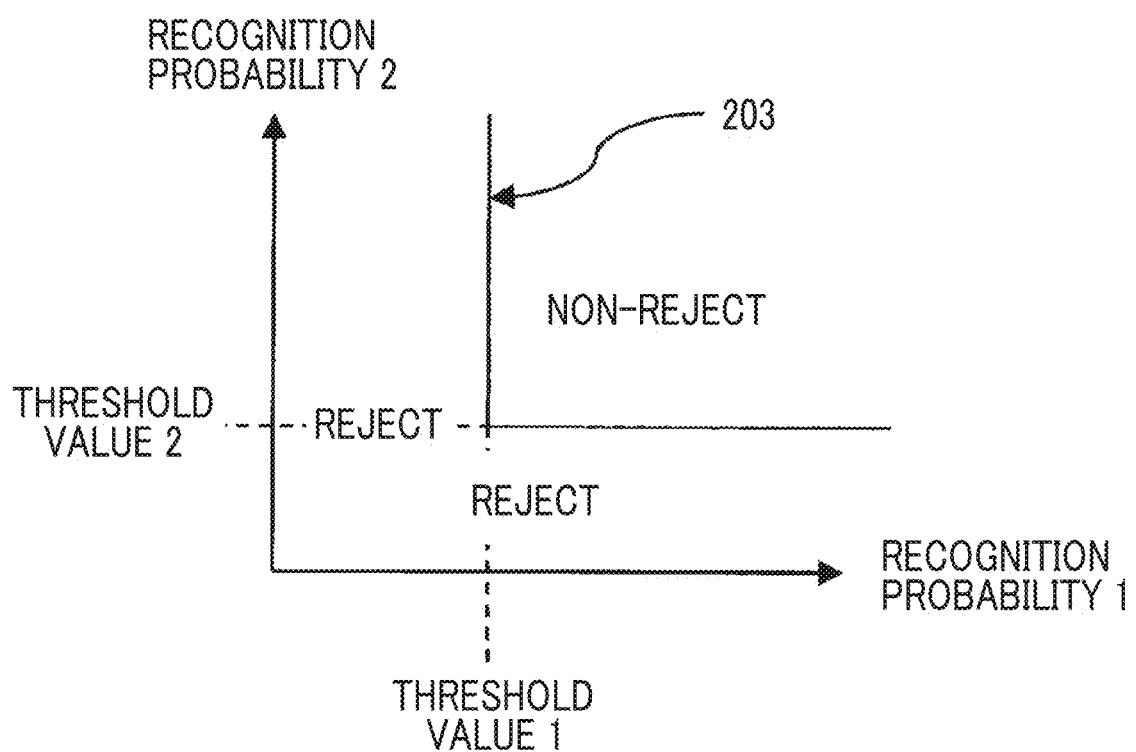
FIG. 10 is a diagram illustrating a bend line-shaped threshold value curve that includes line segments intersecting at one point.

The curve in the threshold value curve is a curve in a mathematical sense. Accordingly, the threshold value curve may be a straight line or a bend line. For example, a threshold value curve 203 illustrated in FIG. 10 includes a straight-line segment of probability 1=threshold value 1 and a straight-line segment of probability 2=threshold value 2.

Second Example where Both Probabilities 1 and 2 are Used

Next, a second example of a processing procedure using both probabilities 1 and 2 in both of matching and mismatching will be described referring to FIG. 11.

Figure 11:
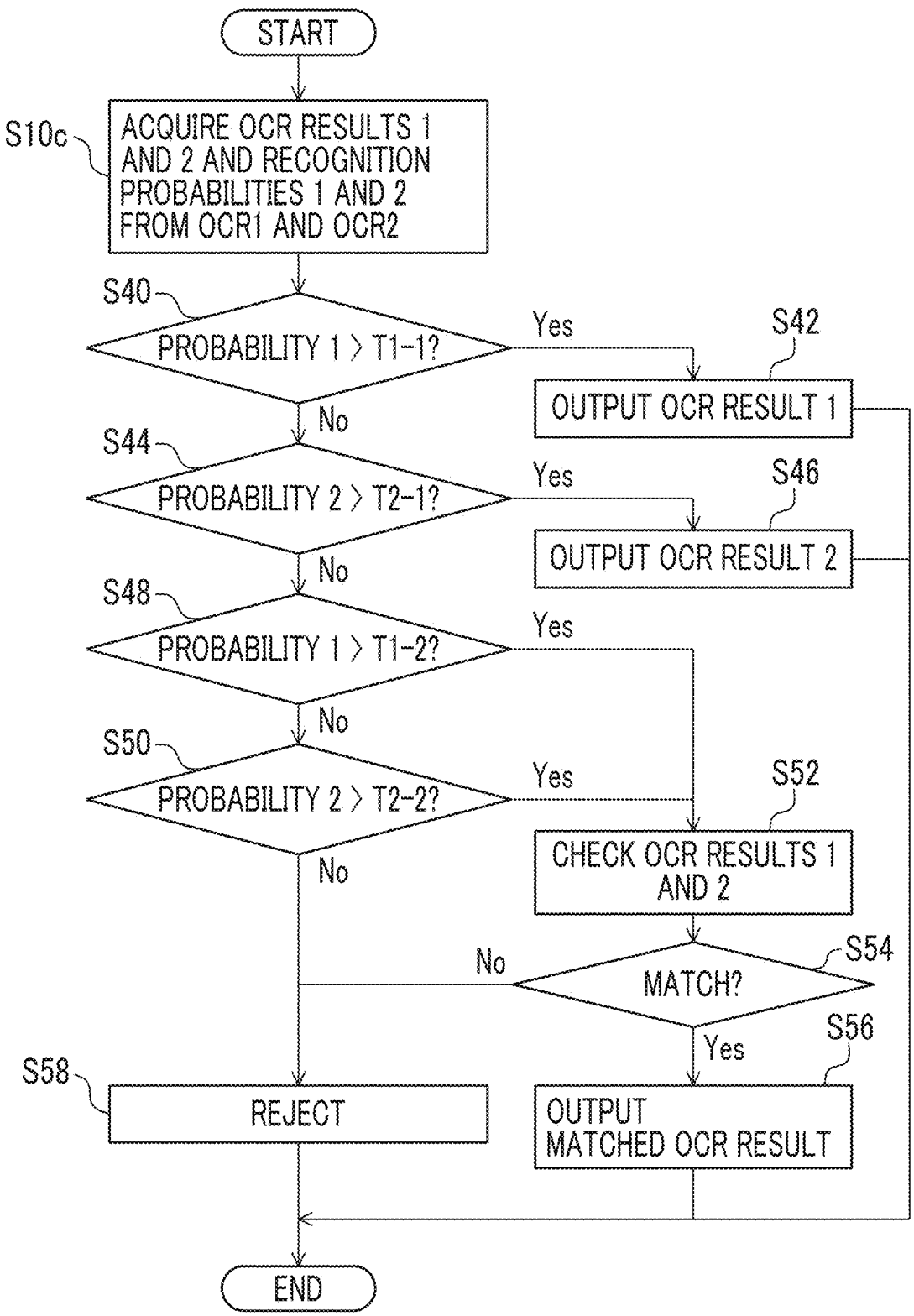
FIG. 11 is a diagram showing another example of a processing procedure of the system.

In the procedure of FIG. 11, four threshold values of T1-1, T1-2, T2-1, and T2-2 are used. Both of T1-1 and T1-2 are threshold values for the probability 1, and T1-1 is greater than T1-2. On the other hand, both of T2-1 and T2-2 are threshold values for the probability 2, and T2-1 is greater than T2-2.

In the procedure, the processor 102 first acquires the OCR result 1 and the probability 1 from the OCR1, and acquires the OCR result 2 and the probability 2 from the OCR2 (S10c). Next, the processor 102 determines whether or not the probability 1 is higher than T1-1 (S40). In a case where a determination result of S40 is Yes, the processor 102 executes the first processing on the OCR result 1 (S42). In the example shown in the drawing, the first processing is processing for outputting the target OCR result as the final recognition result of the system as it is. In a case where the determination result of S40 is No, the processor 102 determines whether or not the probability 2 is higher than T2-1 (S44). In a case where a determination result of S44 is Yes, the processor 102 executes the first processing on the OCR result 2 (S46). Determination regarding whether S40 and S42 or S44 and S46 is to be executed earlier is made depending on which of the OCR1 and the OCR2 is emphasized. The example of FIG. 11 is an example where the OCR1 is emphasized.

In a case where the determination result of S44 is No, the processor 102 determines whether or not the probability 1 is higher than T1-2 (S48), and in a case where a determination result is Yes, progresses to processing of S52. In a case where the determination result of S48 is No, the processor 102 determines whether or not the probability 2 is higher than T2-2 (S50), and in a case where a determination result is Yes, progresses to the processing of S52.

In a case where the determination results of S48 and S50 are No, the processor 102 applies the second processing (for example, reject) to the OCR results 1 and 2 (S58). In this case, for example, "verification and correction" processing to be executed by a person is required.

On the other hand, in S52, the processor 102 checks the OCR results 1 and 2, and subsequently, in S54, the processor 102 determines whether or not a result of the checking is matching or mismatching. In a case where both OCR results match each other in the checking, the processor 102 executes the first processing on the matched OCR result (for example, outputs the OCR result as the final recognition result of the system) (S56). In a case where determination is made in S54 that the checking result is mismatching, the processor 102 applies the second processing (for example, reject) to the matched OCR result (S58).

In the procedure of FIG. 11, in S10c, the OCR result 1 and the like are acquired from the OCR1 and the OCR result 2 and the like are acquired from the OCR2; however, the acquisition of the OCR result 2 and the like from the OCR2 may be deferred to a point of time before the determination of S44 is performed after the determination result of S40 is No.

In the procedure of FIG. 11, a ratio of application of the first processing becomes higher than a system in which the selection of the first processing or the second processing is decided only based on comparison of one of the probabilities 1 and 2 and the threshold value.

Example where Three OCRs are Used

In the example described referring to FIGS. 8 and 9 described above, determination regarding which of the first processing and the second processing is to be applied to the OCR results is made according to whether the two-dimensional coordinates represented by the set of the probabilities of the two OCRs are positioned above or below the threshold value curve. In contrast, hereinafter, a system using three OCRs is illustrated. The three OCRs execute different kinds of text recognition processing from one another.

Though not shown, the system of the example has three OCRs, that is, OCR1, OCR2, and OCR3. The OCR3 executes OCR processing on the input image data 50, thereby obtaining and outputting an OCR result 3 and a probability 3. The OCR1 and the OCR2 are the same as in the above-described example.

A threshold value curved surface can be defined in a three-dimensional space having the probabilities 1, 2, and 3 as coordinate axes. The set of the probabilities 1, 2, and 3 corresponding to the same input image data 50 represent one three-dimensional coordinates in the three-dimensional space. In the example, determination regarding which of the first processing and the second processing is to be applied to the OCR results is made according to whether the three-dimensional coordinate are positioned above or below the threshold value curved surface.

In the example, the OCR results 1 to 3 are checked, and a threshold value curved surface is selected according to a result of the checking. For example, in a case where the OCR results 1 to 3 match one another as a result of the checking (that is, in a case of OCR result 1=OCR result 2=OCR result 3), a threshold value curved surface 210A shown in FIG. 12A is selected. Though not shown in the drawing, the threshold value curved surface 210A is a curved surface in a range of probability $1 \leq 1$, $0 \leq$ probability $2 \leq 1$, and $0 \leq$ probability $3 \leq 1$ in the three-dimensional space. In a case of OCR result 1=OCR result 2≠OCR result 3, a threshold value curved surface 210B shown in FIG. 12B is selected, in a case of OCR result 1≠OCR result 2=OCR result 3, a threshold value curved surface 210C shown in FIG. 12C is selected, and in a case of OCR result 2≠OCR result 3=OCR result 1, a threshold value curved surface 210D shown in FIG. 12D is selected. FIGS. 12B to 12D show a state in which the threshold value curved surface is projected on a plane including the coordinate axes of the two probabilities corresponding to the matched two OCR results. In a case where all of the OCR results 1 to 3 mismatch one another (that is, a case where any two OCR results do not match each other), a threshold value curved surface 210E shown in FIG. 12E is selected.

The threshold value curved surface 210A is positioned above all of the threshold value curved surfaces 210B, 210C, and 210D. That is, a line segment connecting any point on the threshold value curved surface 210A and the origin of the three-dimensional space intersects the threshold value curved surfaces 210B, 210C, and 210D; however, a line segment connecting any point on the threshold value curved surface 210B, 210C, or 210D and the origin does not intersect the threshold value curved surface 210A. The threshold value curved surfaces 210B, 210C, and 210D are positioned above the threshold value curved surface 210E. Of course, the threshold value curved surface 210A is positioned above the threshold value curved surface 210E.

Figure 13:
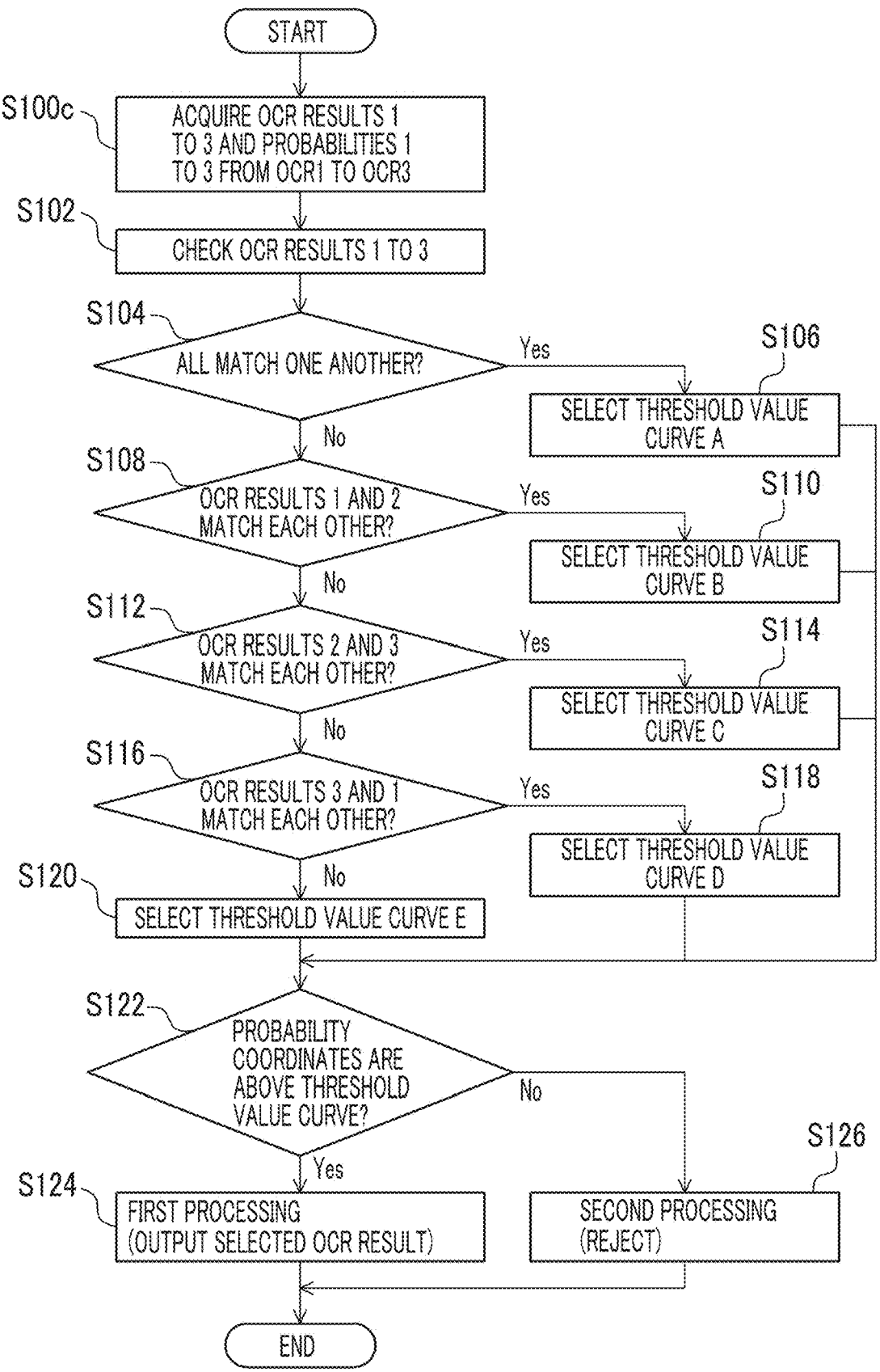
FIG. 13 is a diagram showing an example of a processing procedure of a system using three OCRs.

FIG. 13 illustrates a processing procedure of the example. In the procedure, first, the processor 102 acquires the OCR results 1 to 3 and the probabilities 1 to 3 from the OCR1 to the OCR3 (S100c). Next, the processor 102 checks the OCR results 1 to 3 (S102). The processor 102 determines whether or not all of the OCR results 1 to 3 match one another as a result of the checking (S104), and in a case where a determination result is Yes, selects the threshold value curve 210A (see FIG. 12A) stored in the auxiliary storage device 106 (S106). In a case where the determination result of S104 is No, the processor 102 determines whether or not the OCR results and 2 match each other (S108), and in a case where a determination result is Yes, selects the threshold value curve 210B stored in the auxiliary storage device 106 (S110). In a case where the determination result of S108 is No, the processor 102 whether or not the OCR results 2 and 3 match each other (S112), and in a case where a determination result is Yes, selects the threshold value curve 210C stored in the auxiliary storage device 106 (S114). In a case where the determination result of S112 is No, the processor 102 determines whether or not the OCR results 3 and 1 match each other (S116), and in a case where a determination result is Yes, selects the threshold value curve 210D stored in the auxiliary storage device 106 (S118). In a case where the determination result of S116 is No, all of the OCR results 1 to 3 mismatch one another. In this case, the processor 102 selects the threshold value curve 210E stored in the auxiliary storage device 106 (S120). After S106, S110, S114, S118, or S120, the processor 102 executes processing of S122. In S112, the processor 102 determines whether or not the three-dimensional coordinates represented by the set of the probabilities 1 to 3 are positioned above the threshold value curve selected in S106, S110, S114, S118, or S120. Then, in a case where a determination result of S122 is Yes, the processor 102 executes the first processing (S124), and in a case where the determination result is No, the processor 102 executes the second processing with a human workload greater than the first processing (S126). The first processing is, for example, processing for outputting the target OCR result as the final recognition result of the system. The second processing is, for example, processing in which the OCR result is subjected to "verification and correction" by the operator.

In a case where the determination result of S104, S108, S112, or S116 is Yes, in S124 and S126, the first processing and the second processing should be executed on the matched OCR result. In a case where the determination result of S116 is No, the first processing and the second processing should be executed on the OCR result of the reference OCR selected in advance or the OCR result corresponding to the highest probability among the probabilities 1 to 3.

The threshold value curved surface used in the example is a curve in a mathematical sense. Accordingly, the threshold value curved surface may be a plane.

Second Example where Three OCRs are Used

Next, a second example where three OCRs are used will be described referring to FIG. 14.

Figure 14:
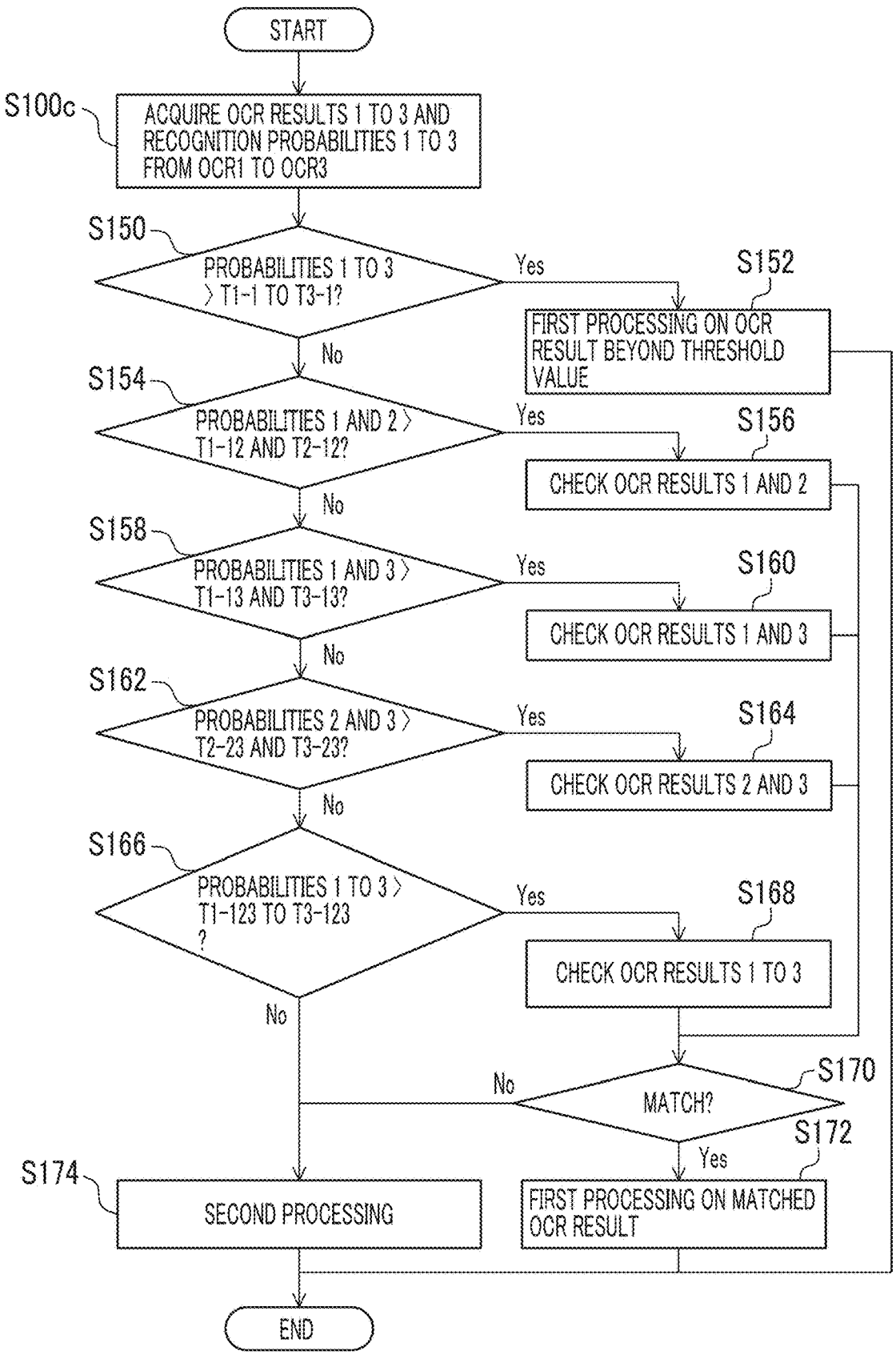
FIG. 14 is a diagram showing another example of a processing procedure of the system using the three OCRs.

In the procedure shown in FIG. 14, the processor 102 first acquires the OCR results 1 to 3 and the probabilities 1 to 3 from the OCR1 to the OCR3 (S100c). Next, the processor 102 determines whether or not the probabilities 1, 2, and 3 are higher than corresponding predetermined threshold values T1-1, T2-1, and T3-1 in an order of the probabilities 1, 2, and 3 (S150). When the probability higher than the corresponding threshold value is found, a determination result of S150 is Yes, and the process progresses to S152. For example, in a case where the probability 1 is higher than the threshold value T1-1, the determination result of S150 is Yes, comparison of the probabilities 2 and 3 with the threshold values is not performed, and the process progresses to S152. In S152, the first processing on the OCR result corresponding to the probability higher than the corresponding threshold value (for example, processing for outputting the OCR result as the recognition result of the system) is executed. In the example, the OCR1 is most emphasized, the OCR2 is next emphasized, and the OCR3 is least emphasized.

In a case where all of the probability 1, 2, and 3 are equal to or lower than the corresponding threshold values T1-1, T2-1, and T3-1, the determination result of S150 is No. In this case, the processor 102 determines whether or not at least one of a condition that the probability 1 is higher than a threshold value T1-12 or a condition that the probability 2 is higher than a threshold value T2-12 is established (S154). T1-12 is a predetermined value lower than T1-1 described above, and T2-12 is a predetermined value lower than T2-1 described above. In a case where a determination result of S154 is Yes, the processor 102 checks the OCR results 1 and 2 (S156), and determines whether or not both OCR results match each other (S170). In a case of matching, the processor 102 executes the first processing on the matched OCR result (for example, the processing for outputting the OCR result) (S172), and in a case of mismatching, the processor 102 executes the second processing (for example, processing in which the matched OCR result is subjected to "verification and correction" by the operator (S174)).

In a case where the determination result of S154 is No, the processor 102 determines whether or not at least one of a condition that the probability 1 is higher than a threshold value T1-13 or a condition that the probability 3 is higher than a threshold value T3-13 is established (S158). T1-13 is a predetermined value lower than T1-1 described above, and T3-13 is a predetermined value lower than T3-1 described above. In a case where a determination result of S158 is Yes, the processor 102 checks the OCR results 1 and 3 (S160), and thereafter, executes the processing of S170 to S174.

In a case where the determination result of S158 is No, the processor 102 determines whether or not at least one of a condition that the probability 2 is higher than a threshold value T2-23 or a condition that the probability 3 is higher than a threshold value T3-23 is established (S162). T2-23 is a predetermined value lower than T2-1 described above, and T3-23 is a predetermined value lower than T3-1 described above. In a case where a determination result of S162 is Yes, the processor 102 checks the OCR results 2 and 3 (S164), and thereafter, executes the processing of S170 to S174.

In a case where the determination result of S162 is No, the processor 102 determines whether or not at least one of a condition that the probability 1 is higher than a threshold value T1-123, a condition that the probability 2 is higher than a threshold value T2-123, or a condition that the probability 3 is higher than a threshold value 13-123 is established (S166). T1-123 is a predetermined value lower than all of T1-1, T1-12, and T1-13 described above. T2-123 is a predetermined value lower than all of T2-1, T2-12, and T2-23 described above. T3-123 is a predetermined value lower than all of T3-1, T3-13, and T3-23 described above. In a case where a determination result of S166 is Yes, the processor 102 checks the OCR results 1 to 3 (S168), and determines whether or not all of the OCR results 1 to 3 match one another (S170). Then, in a case where a determination result of S170 is Yes, S172 is executed, and in a case where the determination result is No, S175 is executed.

In a case where the determination result of S166 is No, the processor 102 executes the second processing (for example, processing for presenting the OCR result to the operator and requesting the operator for "verification and correction"

(S174). The second processing should be executed, for example, on the OCR result 1 of the OCR1 that is most emphasized. As another example, the second processing may be executed on the OCR result corresponding to the highest probability among the probabilities 1 to 3.

Example where N OCRs are Used

The examples of the system using the two OCRs and the system using the three OCRs have been described. Next, an example of a system that more generally uses N OCRs will be described. N is an integer equal to or greater than 2. The N OCRs execute different kinds of text recognition processing from one another.

Figure 15:
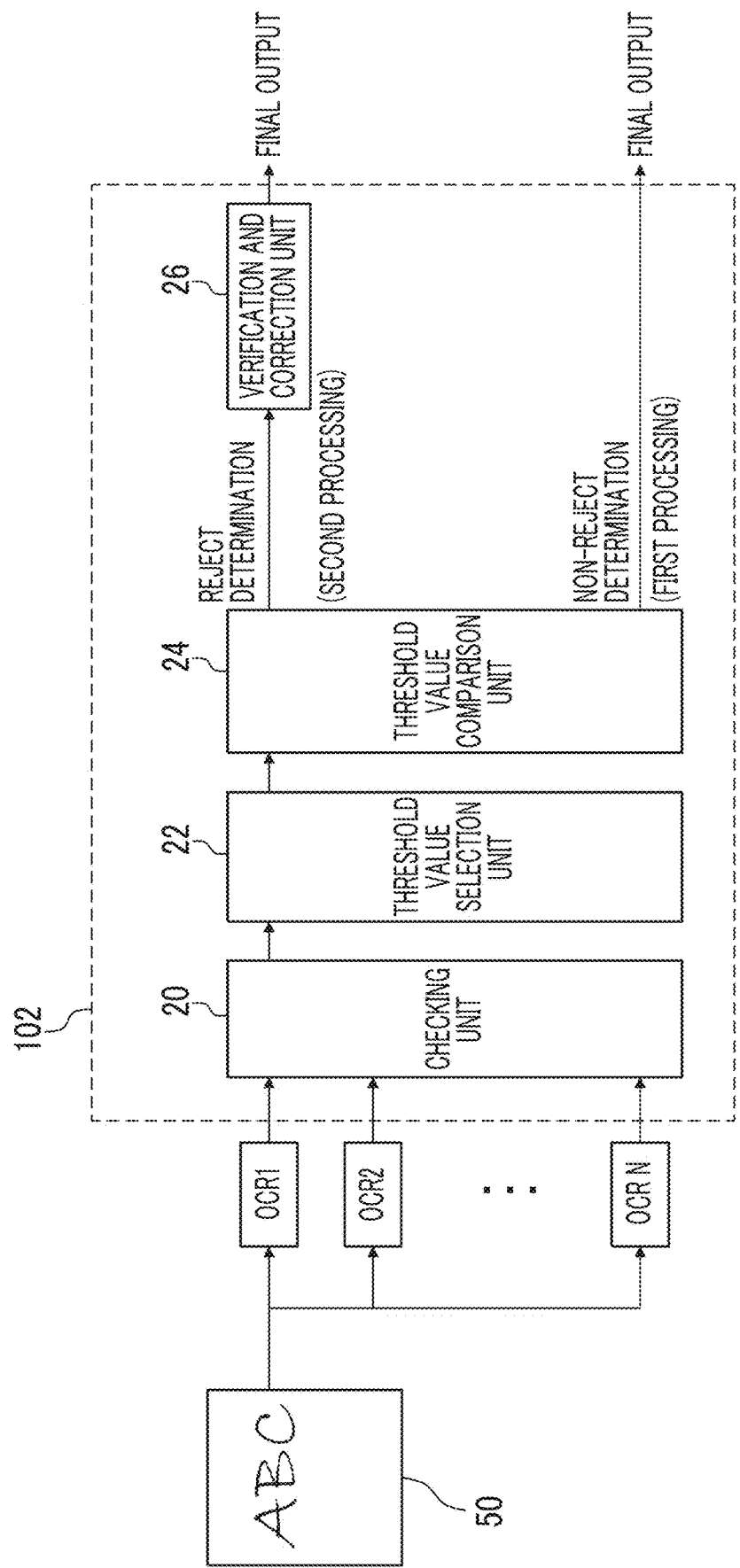
FIG. 15 is a diagram illustrating a system using N OCRs.

FIG. 15 illustrates the configuration of the system. In the system, the N OCRs of OCR1, OCR2, OCR3, . . . , OCR (N−1), and OCRN process the input image data 50. A checking unit 20 acquires OCR results and probabilities from the N OCRs and checks the OCR results. A threshold value selection unit 22 selects a threshold value (for example, a threshold value hypersurface described below) according to a checking result of the checking unit 20. The threshold value comparison unit 24 compares the probabilities obtained from the N OCRs with the threshold value selected by the threshold value selection unit 22, and selects which of first processing and second processing is to be executed based on a result of the comparison. In the example shown in the drawing, the first processing is processing for outputting the OCR result selected according to a predetermined criterion among the OCR results obtained from the N OCRs as the final recognition result of the system. In the second processing, a "verification and correction" unit 26 presents the OCR result selected in the same manner to the operator and subjects the OCR result to verification and correction. The OCR result verified or corrected by the operator is output as the final recognition result of the system.

Here, the threshold value selection unit 22 selects a target OCR group (hereinafter, referred to as a "target group") according to a predetermined criterion from among the N OCRs.

The predetermined criterion for use in the selection is, for example, that a group including the largest number of OCRs from among groups including OCRs, which output the same OCR result, is selected as the target group. For example, assuming that the number of OCRs that output an OCR result A is four, the number of OCRs that output an OCR result B is two, and other OCRs output different OCR results from one another, a group including the four groups, which output the OCR result A, is selected as the target group. In a case where there are a plurality of groups including the largest number of OCRs belonging to each group, for example, a group including an OCR with a highest predetermined priority among the groups should be selected as the target group.

As another example, a criterion that a group including OCRs, which output the same OCR result as the reference OCR selected from among the N OCRs is selected as the target group may be used.

An OCR included in the selected target group is referred to as an adopted OCR. In other words, a set of OCRs adopted according to the predetermined criterion from among the N OCRs is the target group.

For all groups including one or more OCRs among the N OCRs, the threshold value selection unit 22 stores threshold value information corresponding to the groups. The threshold value information corresponding to each group is stored in the auxiliary storage device 106. For example, as shown in FIG. 16, a serial number is allocated to each of the N OCRs, and information regarding whether the OCR is adopted in the target group is represented by 1 (adopted) and 0 (non-adopted) in association with the number of each OCR. An N-bit binary code that can be formed in this way becomes an identification code for uniquely identifying an individual group. The threshold value information is stored in the auxiliary storage device 106, for example, in association with the identification code.

As the threshold value information, for example, a threshold value hypersurface that is a hypersurface in an N-dimensional space having probabilities 1, 2, . . . , and N output from the N OCRs as coordinate components is used. A threshold value hypersurface in a case where N is 2 is a curve in a two-dimensional plane, and a threshold value hypersurface in a case where N is 3 is a curved surface in a three-dimensional space.

Here, as the number n of OCRs belonging to a group is smaller, the threshold value hypersurface corresponding to the group is positioned on an upper side in the N-dimensional space. For example, a threshold value hypersurface of a combination (that is, a group including the OCR1 and the OCR2) in which only the OCR results of the OCR1 and the OCR2 match each other is positioned above a threshold value hypersurface corresponding to a combination in which the OCR results of the OCR1, the OCR2, and the OCR3 match one another. With this, the smaller the number of OCR results that match one another is, the stricter a condition under which the first processing is applied to the OCR result, that is, a threshold value indicated by a threshold value hypersurface is.

The threshold value selection unit 22 reads the threshold value information (for example, the threshold value hypersurface) corresponding to the previously selected target group from the auxiliary storage device 106 and transmits the threshold value information to the threshold value comparison unit 24.

The threshold value comparison unit 24 determines whether or not the set of the N probabilities acquired from the N OCRs is higher than the threshold value using the threshold value information. In a specific example, determination is made whether or not N-dimensional coordinates indicated by the set of the N probabilities are positioned above the threshold value hypersurface corresponding to the target group. Then, the threshold value comparison unit 24 selects the first processing in a case where a determination result is Yes, and selects the second processing otherwise.

Figure 17:
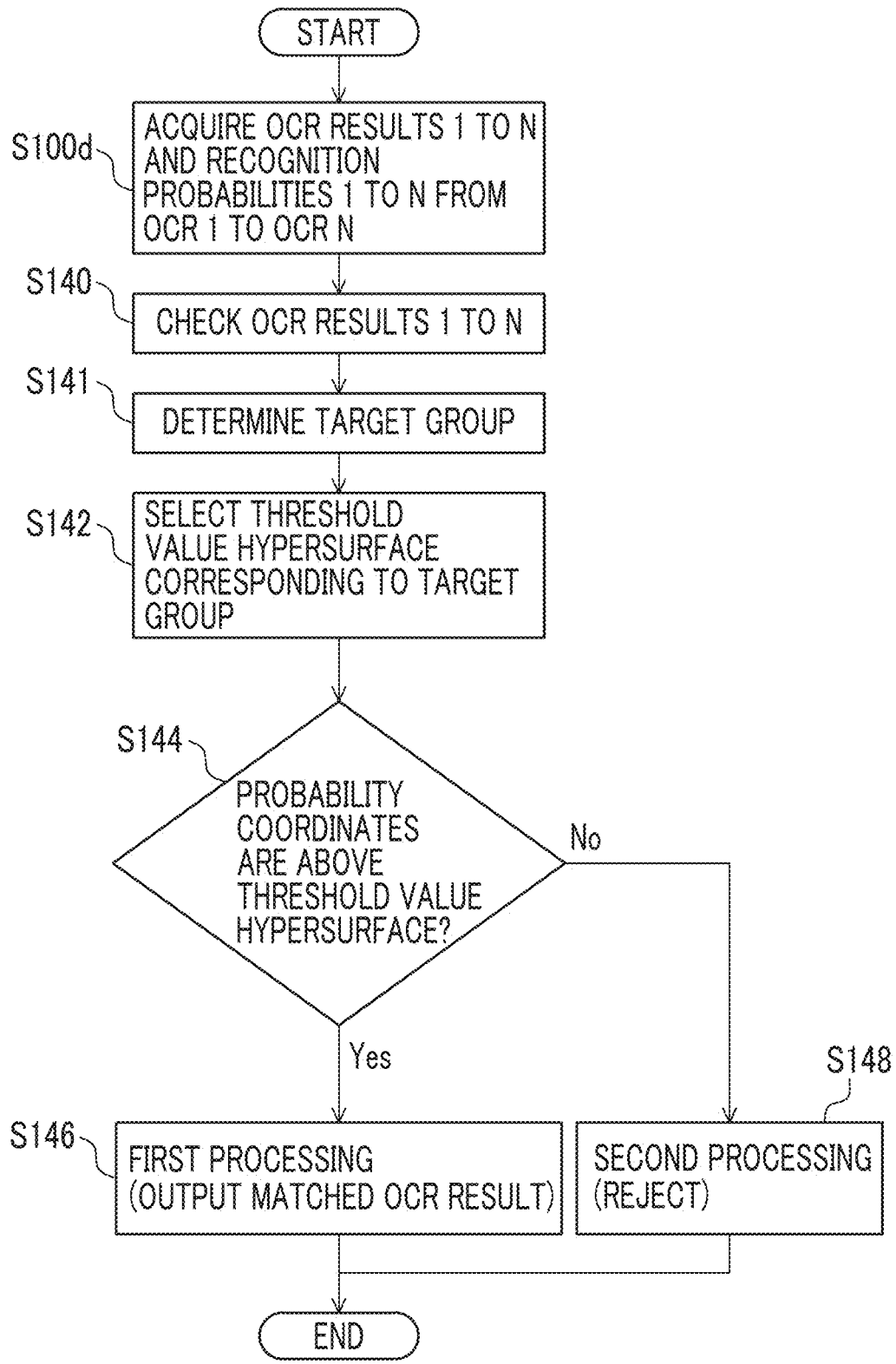
FIG. 17 is a diagram showing an example of a processing procedure of the system using the N OCRs.

Referring to FIG. 17, an example of a processing procedure of the processor 102 in the example will be described. In the example, the processor 102 first acquires the OCR results 1 to N and the probabilities 1 to N from the N OCRs of the OCR1 to the OCRN (S100d). Next, the processor 102 checks the OCR results 1 to N (S140), and determines a target group according to the predetermined criterion based on a result of the checking (S141). In addition, the processor 102 selects a threshold value hypersurface corresponding to the determined group (S142), and determines whether or not the N-dimensional coordinates represented by the probabilities 1 to N are positioned above the threshold value hypersurface (S144). For example, in a case where a line segment connecting the N-dimensional coordinates and the coordinate origin intersects the threshold value hypersurface, determination is made that the N-dimensional coordinates are above the threshold value hypersurface. In a case where a determination result of S144 is Yes, the processor 102 applies the first processing to the matched OCR result corresponding to the target group (S146), and otherwise, the processor 102 applies the second processing (S148).

In the system using the N OCRs described above, even though all of the OCR results match one another, the OCR result is not immediately adopted, and only in a case where the probabilities of the OCR satisfy the condition of the threshold value, the OCR result is adopted. Accordingly, a situation in which incorrect OCR results match each other unexpectedly, and as a result, the OCR result is adopted as the final recognition result hardly occurs.

Threshold Value Setting

The system of the exemplary embodiment may provide a user interface (UI) screen on which settings of the threshold values used in the determination are received from a user.

Figure 18:
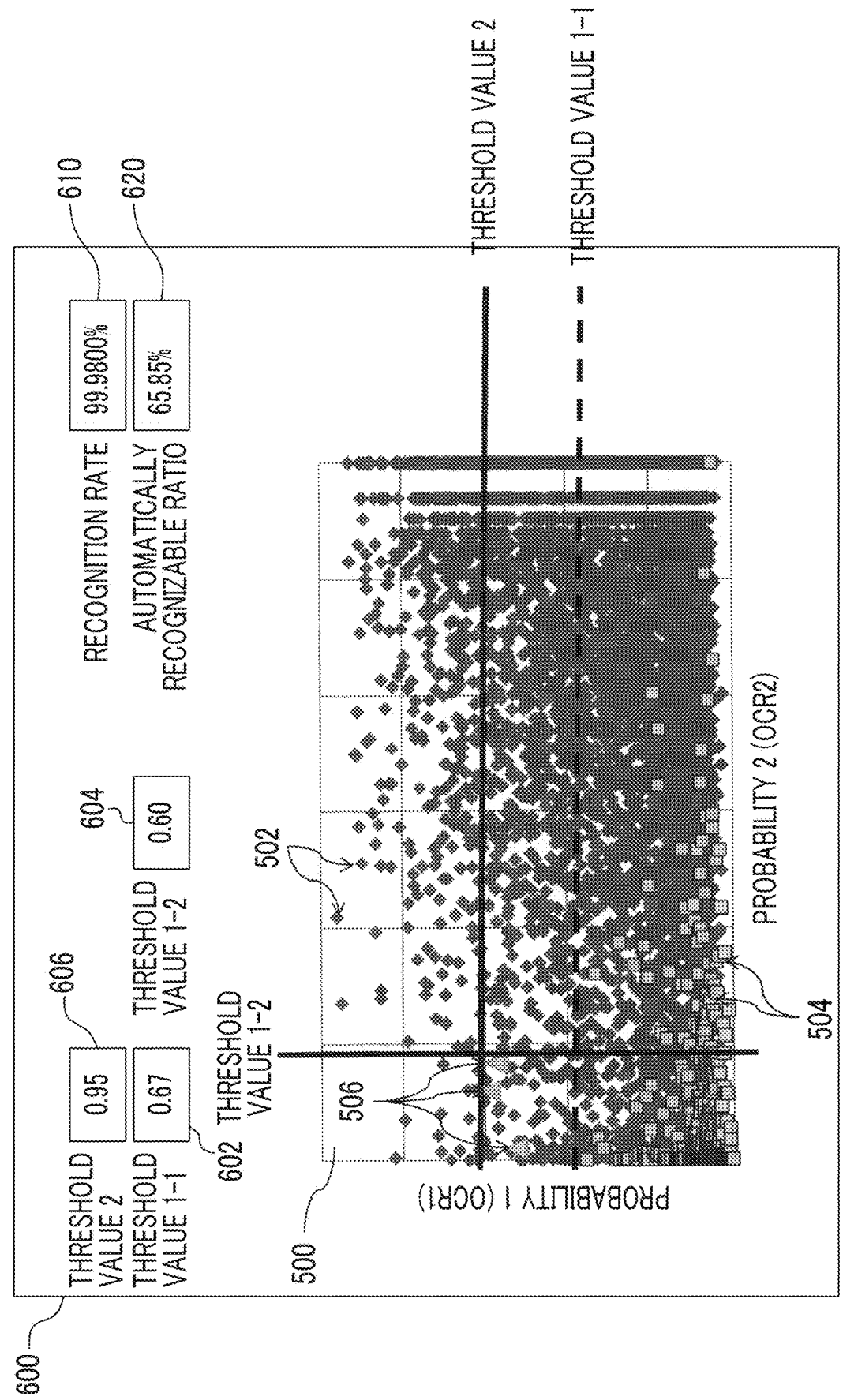
FIG. 18 is a diagram schematically showing an example of a UI screen for setting a threshold value.

FIG. 18 illustrates a UI screen 600. The UI screen 600 is provided for setting the threshold value 1-1, the threshold value 1-2, and the threshold value 2 used in the procedure illustrated in FIG. 6.

The UI screen 600 displays the same scatter diagram 500 as illustrated in FIG. 7. On the scatter diagram 500, settings of the threshold value 1-1 and the threshold value 2 on the probability 1 and the threshold value 1-2 on the probability 2 are received. The threshold value 1-1 and the threshold value 2 are shown as horizontal lines crossing the scatter diagram 500, and the threshold value 1-2 is shown as a vertical line intersecting the scatter diagram 500. The user inputs the values of the threshold values to an input field 602 of the threshold value 1-1, an input field 604 of the threshold value 1-2, and an input field 606 of the threshold value 2. The lines of the threshold values shown on the scatter diagram 500 are displayed at positions according to the threshold values in the input fields 602 to 606.

In the UI screen 600, a recognition rate display field 610 and a ratio display field 620 are shown. In the recognition rate display field 610, a recognition rate that is implemented by a threshold value group set by the user is shown. The recognition rate is a recognition rate in a case where the first processing (S18) is executed in the procedure of FIG. 6, that is, an accuracy rate. In the example, it is assumed that the first processing is processing for outputting the OCR result 1 as the final recognition result of the system. The recognition rate that is displayed in this case is a ratio of correct recognition of the corresponding OCR result 1 based on the set threshold value group among the total number of sample images of a sample image group, for which the determination results of S24 and S26 are Yes, and a sample image group, for which the determination result of S22 is Yes. The ratio display field 620 displays a ratio of application of the first processing (S18) based on the set threshold value group among the total number of sample images. The higher the ratio is, the smaller a necessary human workload is. The user verifies the values displayed in the recognition rate display field 610 and the ratio display field 620 while changing the respective threshold values, and decides a combination of the threshold values such that intended performance is obtained.

Dimension Compression

In the above-described example, although threshold value processing is executed on the N-dimensional space including the N probabilities, the threshold value processing may be executed after the N-dimensional space is compressed to a space having a smaller number of dimensions.

For example, in a system using two OCRs of the OCR1 and the OCR2, X satisfying the following expression may be obtained.

$X=\min(\text{probability 1}, \text{probability 2})$

Then, determination may be made whether to reject or not to reject, that is, which of the second processing and the first processing is to be selected according to whether or not X is higher than a threshold value. The example is an example where two dimensions are compressed to one dimension.

More generally, it is assumed that u<N (where u is an integer equal to or greater than 2), and a u-dimensional vector (x1, x2, . . . , xu) is obtained using a certain function func.

$(x1, x2, \ldots, xu) = \text{func}(\text{probability 1}, \text{probability 2}, \ldots, \text{probability } N)$ Then, reject determination or non-reject determination is made based on a positional relationship between a threshold value hypersurface defined in a u-dimensional space and the vector (x1, x2, . . . , xu).

The exemplary embodiment described above is merely exemplary. Various modifications can be made without departing from the scope of the present invention.

Supplement

The exemplary embodiments described above show, for example, technical configurations listed below.

Configuration (1)

An information processing apparatus including
a processor configured to
acquire a first recognition result and a first recognition probability on target data from a first recognizer,
acquire a second recognition result and a second recognition probability on the target data from a second recognizer,
execute checking of the first recognition result and the second recognition result, and
execute first control in a case where the first recognition result and the second recognition result match each other as a result of the checking,
the first control is control for executing either of first processing or second processing on the matched recognition result and outputting a processing result based on at least one of the first recognition probability or the second recognition probability, and
a human workload necessary for the first processing is smaller than a human workload necessary for the second processing.

Configuration (2)

The information processing apparatus described in Configuration (1),
in which, in a case where the first recognizer between the first recognizer and the second recognizer is selected as a reference recognizer,
in the first control, the first processing is executed on the matched recognition result in a case where the first recognition probability is higher than a threshold value, and the second processing is executed on the matched recognition result in a case where the first recognition probability is equal to or lower than the threshold value.

Configuration (3)

The information processing apparatus described in Configuration (2),
in which the processor is configured to further
execute the first processing on the first recognition result in a case where the first recognition probability is higher than a second threshold value higher than the threshold value before executing the checking, and
the checking is executed in a case where the first recognition probability is equal to or lower than the second threshold value.

Configuration (4)

The information processing apparatus described in Configuration (1), in which, in the first control, the first processing is executed on the matched recognition result in a case where the first recognition probability is higher than a third threshold value and the second recognition probability is higher than a fourth threshold value, and the second processing is executed on the matched recognition result in a case where the first recognition probability is equal to or lower than the third threshold value or the second recognition probability is equal to or lower than the fourth threshold value.

Configuration (5)

The information processing apparatus described in Configuration (4), in which the third threshold value is lower than the threshold value for the first recognition probability for use in control for determining which of the first processing and the second processing is to be executed on the matched recognition result in a case where the second recognition probability is not used in the first control.

Configuration (6)

The information processing apparatus described in Configuration (2), (4), or (5), in which second control is executed in a case where the first recognition result and the second recognition result do not match each other as a result of the checking, and the second control is control for executing the first processing on the first recognition result in a case where the first recognition probability is higher than a second threshold value higher than the threshold value, and executing the second processing on the first recognition result in a case where the first recognition probability is equal to or lower than the second threshold value.

Configuration (7)

The information processing apparatus described in Configuration (1), in which, in the first control, control for determining which of the first processing and the second processing is to be executed on the matched recognition result is executed based on both of the first recognition probability and the second recognition probability.

Configuration (8)

The information processing apparatus described in Configuration (2), in which the processor is configured to further execute the first processing on the first recognition result in a case where the first recognition probability is higher than a fifth threshold value before executing the checking, and execute the first processing on the second recognition result in a case where the second recognition probability is higher than a sixth threshold value before executing the checking, and the checking is executed in a case where the first recognition probability is equal to or lower than the fifth threshold value and the second recognition probability is equal to or lower than the sixth threshold value.

Configuration (9)

The information processing apparatus described in Configuration (7), in which a threshold value curve is defined in a two-dimensional space where a first coordinate axis represents the first recognition probability and a second coordinate axis represents the second recognition probability, and in the first control, the first processing is executed on the matched recognition result in a case where coordinates in the two-dimensional space with the first recognition probability and the second recognition probability acquired from the first recognizer and the second recognizer for the target data as coordinate components are positioned above the threshold value curve, and the second processing is executed on the matched recognition result in a case where the coordinates are positioned on the threshold value curve or below the threshold value curve.

Configuration (10)

The information processing apparatus described in Configuration (2), (4), or (5), in which second control is executed in a case where the first recognition result and the second recognition result do not match each other as a result of the checking, and the second control is control for executing the first processing on the first recognition result or the second recognition result in a case where the coordinates are positioned above a second threshold value curve, and executing the second processing on the first recognition result or the second recognition result in a case where the coordinates are positioned on the second threshold value curve or below the second threshold value curve, and the second threshold value curve is positioned above the threshold value curve for use in the first control in the two-dimensional space.

Configuration (11)

The information processing apparatus described in Configuration (10), in which a recognition result subject to the first processing or the second processing in the second control is a recognition result corresponding to a higher recognition probability of the first recognition probability and the second recognition probability.

Configuration (12)

The information processing apparatus described in Configuration (1), in which the processor is configured to further acquire a third recognition result and a third recognition probability on the target data from a third recognizer, execute checking of the first recognition result, the second recognition result, and the third recognition result in the checking, and execute third control instead of the first control in a case where all of the first recognition result, the second recognition result, and the third recognition result match one another as a result of the checking, the third control is control for executing either of the first processing or the second processing on the matched recognition result and outputting a processing result based on at least one of the first recognition probability, the second recognition probability, or the third recognition probability.

Configuration (13)

The information processing apparatus described in Configuration (12), in which a threshold value curved surface is defined in a three-dimensional space where a first coordinate axis represents the first recognition probability, a second coordinate axis represents the second recognition probability, and a third coordinate axis represents the third recognition probability, and in the third control, the matched recognition result is output in a case where coordinates in the three-dimensional space corresponding to the first recognition probability, the second recognition probability, the third recognition probability acquired from the first recognizer, the second recognizer, and the third recognizer on the target data are positioned above the threshold value curved surface, and the matched recognition result is not output in a case where the coordinates are positioned on the threshold value curved surface or below the threshold value curved surface.

Configuration (14)

The information processing apparatus described in Configuration (13), in which fourth control is executed in a case where two of the first recognition result, the second recognition result, and the third recognition result match each other and remaining one recognition result does not match the two recognition results as a result of the checking, the fourth control is control for outputting the matched recognition result in a case where the coordinates are positioned above a second threshold value curved surface, and not outputting the matched recognition result in a case where the coordinates are positioned on the second threshold value curved surface or below the second threshold value curved surface, and the second threshold value curved surface is positioned above the threshold value curved surface for use in the first control in the three-dimensional space.

Configuration (15)

The information processing apparatus described in Configuration (14), in which a different curved surface is used as the second threshold value curved surface according to two recognition results that match each other among the first recognition result, the second recognition result, and the third recognition result as a result of the checking.

Configuration (16)

The information processing apparatus described in Configuration (14) or (15), in which fifth control is executed in a case where any two of the first recognition result, the second recognition result, and the third recognition result do not match each other as a result of the checking, the fifth control is control for outputting the matched recognition result in a case where the coordinates are positioned above a third threshold value curved surface, and not outputting the matched recognition result in a case where the coordinates are positioned on the third threshold value curved surface or below the third threshold value curved surface, and the third threshold value curved surface is positioned above the second threshold value curved surface in the three-dimensional space.

Configuration (17)

The information processing apparatus described in Configuration (1), in which the processor is configured to further acquire a k-th recognition result and a k-th recognition probability on the target data from a k-th recognizer for each k from k=3 to k=N (where N is an integer equal to or greater than 3), execute checking of the k-th recognition result for each k from k=1 to k=N in the checking, and execute third control instead of the first control in a case where all of the k-th recognition result for each k from k=1 to k=N match one another as a result of the checking, and the third control is control for executing either of the first processing or the second processing on the matched recognition result and outputting a processing result based on at least one of the k-th recognition probability for each k from k=1 to k=N.

Configuration (18)

The information processing apparatus described in Configuration (17), in which a threshold value hypersurface is defined in an N-dimensional space where a k-th coordinate axis represents the k-th recognition probability for each k from k=1 to k=N, and in the third control, the first processing is executed on the matched recognition result in a case where N-dimensional coordinates with the k-th recognition probability for each k from k=1 to k=N as coordinate components are positioned above the threshold value hypersurface, and the second processing is executed on the matched recognition result in a case where the N-dimensional coordinates are positioned on the threshold value hypersurface or below the threshold value hypersurface.

Configuration (19)

The information processing apparatus described in Configuration (18), in which the threshold value hypersurface is defined for each group including n recognizers for each n of n=1 to N, and in which the processor is configured to select a target group from among groups including one or more recognizers, which output a recognition result matched one another, according to a predetermined criterion, execute the first processing on the matched recognition result within the target group in a case where the N-dimensional coordinates are positioned above the threshold value hypersurface defined on the target group, and execute the second processing on the matched recognition result within the target group in a case where the N-dimensional coordinates are positioned on the threshold value hypersurface or below the threshold value hypersurface as a result of checking.

Configuration (20)

The information processing apparatus described in Configuration (19), in which the predetermined criterion is a criterion for selecting, as the target group, a group including the largest number of recognizers belonging to the group from among the groups including one or more recognizers, which output a recognition result matched one another.

Configuration (21)

The information processing apparatus described in Configuration (19) or (20), in which the threshold value hypersurface defined for each group including the n recognizers is positioned on an upper side in the N-dimensional space as n is smaller.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
acquire a first recognition result and a first recognition probability on target data from a first recognizer,
acquire a second recognition result and a second recognition probability on the target data from a second recognizer,
execute checking of the first recognition result and the second recognition result,
execute first control in a case where the first recognition result and the second recognition result match each other as a result of the checking, and execute second control in a case where the first recognition result and the second recognition result do not match each other as a result of the checking, wherein the first control is control for executing either of first processing or second processing on the matched recognition result and outputting a processing result based on at least one of the first recognition probability or the second recognition probability, wherein the second control is control for executing either of the first processing or the second processing on the first recognition result, and wherein a human workload for the first processing is smaller than a human workload for the second processing.

2. The information processing apparatus according to claim 1, wherein, in the first control, the first processing is executed on the matched recognition result in a case where the first recognition probability is higher than a threshold value, and the second processing is executed on the matched recognition result in a case where the first recognition probability is equal to or lower than the threshold value.

3. The information processing apparatus according to claim 2, wherein the processor is configured to further execute the first processing on the first recognition result in a case where the first recognition probability is higher than a second threshold value higher than the threshold value before executing the checking, and the checking is executed in a case where the first recognition probability is equal to or lower than the second threshold value.

4. The information processing apparatus according to claim 1, wherein, in the first control, the first processing is executed on the matched recognition result in a case where the first recognition probability is higher than a third threshold value and the second recognition probability is higher than a fourth threshold value, and the second processing is executed on the matched recognition result in a case where the first recognition probability is equal to or lower than the third threshold value or the second recognition probability is equal to or lower than the fourth threshold value.

5. The information processing apparatus according to claim 4, wherein the third threshold value is lower than the threshold value for the first recognition probability for use in control for determining which of the first processing and the second processing is to be executed on the matched recognition result in a case where the second recognition probability is not used in the first control.

6. The information processing apparatus according to claim 2, wherein the second control is control for executing the first processing on the first recognition result in a case where the first recognition probability is higher than a second threshold value higher than the threshold value, and executing the second processing on the first recognition result in a case where the first recognition probability is equal to or lower than the second threshold value.

7. The information processing apparatus according to claim 4, wherein the second control is control for executing the first processing on the first recognition result in a case where the first recognition probability is higher than a second threshold value higher than the threshold value, and executing the second processing on the first recognition result in a case where the first recognition probability is equal to or lower than the second threshold value.

8. The information processing apparatus according to claim 5, wherein the second control is control for executing the first processing on the first recognition result in a case where the first recognition probability is higher than a second threshold value higher than the threshold value, and executing the second processing on the first recognition result in a case where the first recognition probability is equal to or lower than the second threshold value.

9. The information processing apparatus according to claim 1, wherein, in the first control, control for determining which of the first processing and the second processing is to be executed on the matched recognition result is executed based on both of the first recognition probability and the second recognition probability.

10. The information processing apparatus according to claim 9, wherein the processor is configured to further execute the first processing on the first recognition result in a case where the first recognition probability is higher than a fifth threshold value before executing the checking, and execute the first processing on the second recognition result in a case where the second recognition probability is higher than a sixth threshold value before executing the checking, and the checking is executed in a case where the first recognition probability is equal to or lower than the fifth threshold value and the second recognition probability is equal to or lower than the sixth threshold value.

11. The information processing apparatus according to claim 1, wherein the processor is configured to further acquire a k-th recognition result and a k-th recognition probability on the target data from a k-th recognizer for each k from k=3 to k=N (where N is an integer equal to or greater than 3), execute checking of the k-th recognition result for each k from k=1 to k=N in the checking, and execute third control instead of the first control in a case where all of the k-th recognition result for each k from k=1 to k=N match one another as a result of the checking, and the third control is control for executing either of the first processing or the second processing on the matched recognition result and outputting a processing result based on at least one of the k-th recognition probability for each k from k=1 to k=N.

12. A non-transitory computer readable medium storing a program that causes a computer to execute processing for acquiring a first recognition result and a first recognition probability on target data from a first recognizer, acquiring a second recognition result and a second recognition probability on the target data from a second recognizer, executing checking of the first recognition result and the second recognition result, executing first control in a case where the first recognition result and the second recognition result match each other as a result of the checking, and executing second control in a case where the first recognition result and the second recognition result do not match each other as a result of the checking, wherein the first control is control for executing either of first processing or second processing on the matched recognition result and outputting a processing result based on at least one of the first recognition probability or the second recognition probability, wherein the second control is control for executing either of the first processing or the second processing on the first recognition result, and wherein a human workload for the first processing is smaller than a human workload for the second processing.

* * * * *